(12) United States Patent
Trotter et al.

(10) Patent No.: US 12,130,223 B2
(45) Date of Patent: Oct. 29, 2024

(54) OPTIMIZED SORTING GATES

(71) Applicant: Becton, Dickinson and Company, Franklin Lakes, NJ (US)

(72) Inventors: Joseph T. Trotter, La Jolla, CA (US); Allison Irvine, Oakland, CA (US); Nikolay Samusik, Jacksonville, OR (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

(21) Appl. No.: 18/236,203

(22) Filed: Aug. 21, 2023

(65) Prior Publication Data

US 2023/0393048 A1 Dec. 7, 2023

Related U.S. Application Data

(63) Continuation of application No. 17/970,974, filed on Oct. 21, 2022, now Pat. No. 11,788,946, which is a continuation of application No. 16/739,680, filed on Jan. 10, 2020, now Pat. No. 11,513,054.

(60) Provisional application No. 62/817,555, filed on Mar. 12, 2019, provisional application No. 62/791,316, filed on Jan. 11, 2019.

(51) Int. Cl.
*G01N 15/1429* (2024.01)
*G01N 15/10* (2024.01)
*G01N 15/14* (2024.01)
*G01N 15/149* (2024.01)

(52) U.S. Cl.
CPC . *G01N 15/1429* (2013.01); *G01N 2015/1006* (2013.01); *G01N 2015/1402* (2013.01); *G01N 15/149* (2024.01)

(58) Field of Classification Search
CPC ............ G01N 15/1429; G01N 15/149; G01N 2015/1006; G01N 2015/1402
See application file for complete search history.

(56) References Cited

U.S. PATENT DOCUMENTS 5,804,143 A 9/1998 Leary et al.
8,709,817 B2 4/2014 Durack et al.
(Continued)

FOREIGN PATENT DOCUMENTS

CN 105431725 A 3/2016
WO WO2014121126 A2 8/2014
(Continued)

OTHER PUBLICATIONS

Aghaeepour, et al. "GateFinder: projection-based gating strategy optimization for flow and mass cytometry", Bioinformatics, vol. 34, No. 23, May 29, 2018 (May 29, 2018), pp. 4131-4133.
(Continued)

*Primary Examiner* — Michael McCullough
*Assistant Examiner* — Jessica L Burkman
(74) *Attorney, Agent, or Firm* — Bret E. Field; BOZICEVIC, FIELD & FRANCIS LLP

(57) ABSTRACT

Disclosed herein include systems, devices, and methods for determining a gating strategy. An acquisition system can cause a particle analyzer to collect parameter measurements of some particles of a sample. An analysis system can receive the parameter measurements and determine a gating strategy from the parameter measurements. The acquisition can collect measurements of some or all of the remaining particles of the sample using the gating strategy determined by the analysis system.

21 Claims, 12 Drawing Sheets

(56) References Cited

U.S. PATENT DOCUMENTS

| | | |
|---|---|---|
| 9,222,874 B2 | 12/2015 | Hill et al. |
| 2010/0228491 A1 | 9/2010 | Guitierrez et al. |
| 2012/0080082 A1 | 4/2012 | Suh |
| 2013/0090259 A1 | 4/2013 | Kotsopoulou et al. |
| 2013/0298097 A1 | 11/2013 | Chang et al. |
| 2014/0097129 A1 | 4/2014 | Foster et al. |
| 2017/0010231 A1 | 1/2017 | Wouters |
| 2017/0102310 A1 | 4/2017 | Xu et al. |
| 2017/0268981 A1 | 9/2017 | Diebold et al. |
| 2020/0018704 A1 | 1/2020 | Sussman et al. |

FOREIGN PATENT DOCUMENTS

| | | |
|---|---|---|
| WO | WO2014186527 A1 | 11/2014 |
| WO | WO2019209723 A1 | 10/2019 |
| WO | WO2020047468 A1 | 3/2020 |
| WO | WO2020081292 A1 | 4/2020 |

OTHER PUBLICATIONS

Misra, et al. "Flow-based sorting of neonatal lymphocyte populations for transcriptomics analysis", Journal of Immunological Methods, Elsevier Science Publishers B.V., Amsterdam, NL, vol. 437, Jul. 18, 2016 (Jul. 18, 2016), pp. 13-20.

O'Neill, et al. "Flow Cytometry Bioinformatics", PLoS Computational Biology, vol. 9, No. 12, Dec. 5, 2013, pp. 1-10.

Yu, et al. "CellSort: A support vector machine tool for optimizing fluorescence-activated cell sorting and reducing experimental effort", Bioinformatics, Dec. 20, 2016 (Dec. 20, 2016), pp. 909-916.

OPTIMIZED SORTING GATES

CROSS REFERENCE TO RELATED APPLICATIONS

This application is a continuation of U.S. patent application Ser. No. 17/970,974, filed Oct. 21, 2022, which is a continuation of U.S. patent application Ser. No. 16/739,680, filed Jan. 10, 2020, now granted U.S. Pat. No. 11,513,054, which claims priority to U.S. Provisional Patent Application Ser. No. 62/791,316, filed Jan. 11, 2019, and to U.S. Provisional Patent Application Ser. No. 62/817,555 filed Mar. 12, 2019, the disclosures of which applications are incorporated herein by reference.

INTRODUCTION

Field

This disclosure relates generally to the field of automated particle assessment, and more particularly to sample analysis and particle characterization methods.

Description of the Related Art

Particle analyzers, such as flow cytometers, can enable the characterization of particles on the basis of electro-optical measurements such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components can be simultaneously detected by using spectrally distinct fluorescent dyes to label the different particles or components. Different cell types can be identified by their light scatter characteristics and fluorescence emissions resulting from labeling various cell proteins or other constituents with fluorescent dye-labeled antibodies or other fluorescent probes. The data obtained from an analysis of cells (or other particles) by multi-color flow cytometry are multidimensional, where each cell corresponds to a point in a multidimensional space defined by the parameters measured. Populations of cells or particles can be identified as clusters of points in the data space.

SUMMARY

Disclosed herein include embodiments of an acquisition system for sorting a plurality of particles of a sample. In some embodiments, the acquisition system comprises: non-transitory memory configured to store executable instructions; and a processor (e.g., a hardware processor, and a processor of a virtual machine) in communication with the non-transitory memory, the processor programmed by the executable instructions to: transmit (1) measurements of parameters of a first plurality of particles of a sample associated with an experiment collected by a particle analyzer, and (2) first associated experiment information of the experiment in a first format to an analysis system (e.g., a software as a service (SaaS) system). The processor can be programmed by the executable instructions to: receive second associated experiment information of the experiment from the analysis system in the first format. The analysis system can be programmed to: receive reference sorting criteria for the first plurality of particles of the sample associated with the experiment; generate a gating strategy based on (1) the measurements of the parameters of the first plurality of particles of the sample associated with the experiment, and (2) the reference sorting criteria for the first plurality of particles of the sample associated with the experiment; and generate the second associated experiment information of the experiment comprising the first associated experiment information of the experiment and the gating strategy (or a representation of the gating strategy) in the first format. Alternatively or additionally, the second associated experiment information received is generated by the analysis system by: receiving reference sorting criteria for the first plurality of particles of the sample associated with the experiment; generating a gating strategy (or a representation of the gating strategy) based on (1) the measurements of the parameters of the first plurality of particles of the sample associated with the experiment, and (2) the reference sorting criteria for the first plurality of particles of the sample associated with the experiment; and generating the second associated experiment information of the experiment comprising the first associated experiment information of the experiment and the gating strategy (or a representation of the gating strategy) in the first format. Alternatively or additionally, the second associated experiment information received is indicative the analysis system has: received reference sorting criteria for the first plurality of particles of the sample associated with the experiment; generated a gating strategy (or a representation of the gating strategy) based on (1) the measurements of the parameters of the first plurality of particles of the sample associated with the experiment, and (2) the reference sorting criteria for the first plurality of particles of the sample associated with the experiment; and generated the second associated experiment information of the experiment comprising the first associated experiment information of the experiment and the gating strategy (or a representation of the gating strategy) in the first format. The processor can be programmed by the executable instructions to: transmit a particle analyzer configuration that represents the gating strategy (e.g., the gating strategy or a representation of the gating strategy) and generated from the second associated experiment information of the experiment to the particle analyzer.

Disclosed herein include embodiments of an acquisition system for sorting a plurality of particles of a sample. In some embodiments, the acquisition system comprises: non-transitory memory configured to store executable instructions; and a processor (e.g., a hardware processor of a virtual processor of a virtual machine) in communication with the non-transitory memory, the processor programmed by the executable instructions to: transmit (1) measurements of parameters of a first plurality of particles of a sample associated with an experiment collected by a particle analyzer, and (2) first associated experiment information of the experiment in a first format to an analysis system (e.g., a software as a service (SaaS) system), wherein the analysis system is programmed to: receive reference sorting criteria for the first plurality of particles of the sample associated with the experiment; and generate a gating strategy (or a representation of the gating strategy) based on (1) the measurements of the parameters of the first plurality of particles of the sample associated with the experiment, and (2) the reference sorting criteria for the first plurality of particles of the sample associated with the experiment. In some embodiments, the analysis system is programmed to: generate second associated experiment information of the experiment comprising the first associated experiment information of the experiment and the gating strategy (or a representation of the gating strategy) in the first format, and the processor is programmed by the executable instructions to: receive the second associated experiment information of the experiment from the analysis system in the first format; and transmit a particle analyzer configuration that represents the gating strategy (e.g., the gating strategy or a representation of the gating strategy) and generated from the second associated experiment information of the experiment to the particle analyzer. In some embodiments, the analysis system is programmed to: generate a particle analyzer configuration that comprises the first associated experiment information and represents the gating strategy (e.g., the gating strategy or a representation of the gating strategy) in the first format (e.g., readable by the acquisition system); and transmit the particle analyzer configuration to the acquisition system, and wherein the hardware processor is programmed by the executable instructions to: receive the particle analyzer configuration.

Disclosed herein include embodiments of an acquisition system for sorting a plurality of particles of a sample. In some embodiments, the acquisition system comprises: non-transitory memory configured to store executable instructions; and a processor (e.g., a hardware processor of a virtual processor of a virtual machine) in communication with the non-transitory memory, the processor programmed by the executable instructions to: transmit (1) measurements of parameters of a first plurality of particles of a sample associated with an experiment collected by a particle analyzer, and (2) first associated experiment information of the experiment in a first format to an analysis system (e.g., a software as a service (SaaS) system), wherein the analysis system is programmed to: receive reference sorting criteria for the first plurality of particles of the sample associated with the experiment; and generate a gating strategy (or a representation of the gating strategy) based on (1) the measurements of the parameters of the first plurality of particles of the sample associated with the experiment, and (2) the reference sorting criteria for the first plurality of particles of the sample associated with the experiment; and receive an indication of the gating strategy has been generated. In some embodiments, the analysis system is programmed to: generate second associated experiment information of the experiment comprising the first associated experiment information of the experiment and the gating strategy (or the representation of the gating strategy) in the first format, the indication of the gating strategy has been generated comprises the second associated experiment information of the experiment, and the processor is programmed by the executable instructions to: transmit a particle analyzer configuration that represents the gating strategy (e.g., the gating strategy or the representation of the gating strategy) and generated from the second associated experiment information of the experiment to the particle analyzer. In some embodiments, the analysis system is programmed to: generate a particle analyzer configuration that comprises the first associated experiment information and represents the gating strategy (e.g., the gating strategy or the representation of the gating strategy), the indication of the gating strategy has been generated comprises the particle analyzer configuration, and the processor is programmed by the executable instructions to: transmit the particle analyzer configuration to the particle analyzer.

In some embodiments, to generate the gating strategy, the analysis system is programmed to: use a gating method (e.g., a gating method implemented by an analysis tool) to generate the gating strategy based on (1) the measurements of the parameters of the first plurality of particles of the sample associated with the experiment, and (2) the reference sorting criteria for the first plurality of particles of the sample associated with the experiment. The second associated experiment information can comprise the gating method, one or more input parameters of the gating method, one or more output parameters of the gating method, and/or the analysis tool. The particle analyzer configuration can comprise the gating method, one or more input parameters of the gating method, one or more output parameters of the gating method, and/or the analysis tool. To generate the second associated experiment information, the analysis system can be programmed to: generate a file comprising the first associated experiment information, the gating strategy, the second associated experiment information, the gating method for generating the gating strategy, one or more input parameters of the gating method, one or more output parameters of the gating method, and/or the analysis tool implementing the gating method. The analysis system can be programmed to generate a representation of the gating strategy (e.g., in the first format readable by the acquisition system) from the gating strategy.

In some embodiments, the gating strategy (or the representation of the gating strategy) can comprise a plurality of gates corresponding to pairs of the parameters. The reference sorting criteria can comprise a first plurality of particles of interest selected from the first plurality of particles. To generate the gating strategy, the analysis system is programmed to: determine the number of the plurality of gates based on a measure of distinguishing the first plurality of particles of interest from the remaining particles of first plurality of particles using the gating strategy (or the representation of the gating strategy), wherein the plurality of gates correspond to some or all of the parameters; and generate a plurality of polygons based on the measurements of the parameters of the first plurality particles of the sample, the sorting criteria, and the plurality of gates, wherein at least two of the plurality of polygons comprise polygons of different shapes, wherein the number of the plurality of gates and the number of the plurality of polygons are identical. The measure can comprise a purity measure and a yield measure of distinguishing the first plurality of particles of interest from the remaining particles of the first plurality of particles using the gating strategy (or the representation of the gating strategy). To generate the plurality of polygons, the analysis system is programmed to: generate the plurality of polygons enclosing some or all of the plurality of particles of interest.

In some embodiments, the processor is programmed by the executable instructions to: receive the measurements of the parameters of the first plurality of particles of the sample associated with the experiment from the particle analyzer.

In some embodiments, the processor can be programmed by the executable instructions to: receive the first associated experiment information in a second format from the particle analyzer; generate the first associated experiment information in the first format from the first associated experiment information in the second format; and generate the second associated experiment information in the second format from the second associated experiment information the first format. To transmit the particle analyzer configuration that represents the gating strategy (e.g., the gating strategy or the representation of the gating strategy) to the particle analyzer, the processor is programmed by the executable instructions to: transmit the particle analyzer configuration that represents the gating strategy and generated from the second associated experiment information in the second format to the particle analyzer. The first associated experiment information in the second format can comprise an identifier of the particle analyzer, and wherein the first associated experiment information in the first format comprises an identifier of another particle analyzer. The second associated experiment information in the second format can comprise an identifier of the particle analyzer, and wherein the second associated experiment information in the first format comprises an identifier of another particle analyzer. The analysis system can be programed to, prior to generating the gating strategy (or the representation of the gating strategy): determine the first associated experiment information is in the first format.

In some embodiments, the first associated experiment information in the first format comprises an identifier of the particle analyzer. The first associated experiment information in the first format can comprise an identifier of the acquisition system. The processor can be programmed by the executable instructions to: generate the particle analyzer configuration for the particle analyzer that represents the gating strategy (e.g., the gating strategy or the representation of the gating strategy), and the particle analyzer configuration can cause the particle analyzer to: collect measurements of the parameters of a second plurality of particles of the sample associated with the experiment based at least in part on the particle analyzer configuration. The reference sorting criteria can comprise gating information identifying a plurality of values of the parameters of the first plurality of particles of the sample for distinguishing a first plurality of particles of interest from remaining particles of the first plurality of particles.

In some embodiments, to receive the reference sorting criteria for the first plurality of particles of the sample, the analysis system is programmed to: receive a selection of a first plurality of particles of interest from the first plurality of particles of interest. To receive the selection of the first plurality of particles of interest, the analysis system can be programmed to: display a plurality of images corresponding to the measurements of the parameters of the first plurality of particles of the sample associated with the experiment.

In some embodiments, the measurements of the parameters of the first plurality of particles of the sample comprise measurements of light emitted fluorescently by the first plurality of particles. The light emitted fluorescently by the first plurality of particles can comprise light emitted fluorescently by cellular component binding reagents bound to the first plurality of particles.

Disclosed herein includes embodiments of an analysis system (e.g., a software as a service (SaaS) system) for generating a gating strategy (or a representation of the gating strategy). The analysis system can comprise: non-transitory memory configured to store executable instructions; and a processor (e.g., a hardware processor, and a processor of a virtual machine) in communication with the non-transitory memory, the processor programmed by the executable instructions to: receive, from an acquisition system in communication with a particle analyzer, (1) measurements of parameters of a first plurality of particles of a sample associated with an experiment, and (2) first associated experiment information of the experiment in a first format. The processor can be programmed by the executable instructions to: receive reference sorting criteria for the first plurality of particles of the sample associated with the experiment. The processor can be programmed by the executable instructions to: generate a gating strategy (or a representation of the gating strategy) based on (1) the measurements of the parameters of the first plurality of particles of the sample associated with the experiment, and (2) the reference sorting criteria for the first plurality of particles of the sample associated with the experiment. The processor can be programmed by the executable instructions to: generate second associated experiment information of the experiment comprising the first associated experiment information of the experiment and the gating strategy (or a representation of the gating strategy) in the first format. The processor can be programmed by the executable instructions to: transmit the second associated experiment information of the experiment to the acquisition system.

Disclosed herein includes embodiments of an analysis system (e.g., a software as a service (SaaS) system) for generating a gating strategy (or a representation of the gating strategy). The analysis system can comprise: non-transitory memory configured to store executable instructions; and a processor (e.g., a processor, and a processor of a virtual machine) in communication with the non-transitory memory, the processor programmed by the executable instructions to: receive, from an acquisition system in communication with a particle analyzer, (1) measurements of parameters of a first plurality of particles of a sample associated with an experiment, and (2) first associated experiment information of the experiment in a first format; receive reference sorting criteria for the first plurality of particles of the sample associated with the experiment; and generate a gating strategy based on (1) the measurements of the parameters of the first plurality of particles of the sample associated with the experiment, and (2) the reference sorting criteria for the first plurality of particles of the sample associated with the experiment. In some embodiments, the processor is programmed by the executable instructions to: generate second associated experiment information of the experiment comprising the first associated experiment information of the experiment and the gating strategy (or a representation of the gating strategy) in the first format; and transmit the second associated experiment information of the experiment to the acquisition system. In some embodiments, the processor is programmed by the executable instructions to: generate a particle analyzer configuration that comprises the first associated experiment information and represents the gating strategy (e.g., the gating strategy or the representation of the gating strategy); and transmit the particle analyzer configuration to the acquisition system, wherein the acquisition system is programmed to: receive the particle analyzer configuration.

Disclosed herein includes embodiments of an analysis system (e.g., a software as a service (SaaS) system) for generating a gating strategy (or a representation of the gating strategy). The analysis system can comprise: non-transitory memory configured to store executable instructions; and a processor (e.g., a hardware processor, and a processor of a virtual machine) in communication with the non-transitory memory, the processor programmed by the executable instructions to: receive, from an acquisition system in communication with a particle analyzer, (1) measurements of parameters of a first plurality of particles of a sample associated with an experiment, and (2) first associated experiment information of the experiment in a first format; receive reference sorting criteria for the first plurality of particles of the sample associated with the experiment; and generate a gating strategy (or a representation of the gating strategy) based on (1) the measurements of the parameters of the sample associated with the experiment, and (2) the reference sorting criteria for the first plurality of particles of the sample associated with the experiment; and transmit an indication of the gating strategy has been generated to the acquisition system. In some embodiments, the processor is programmed by the executable instructions to: generate second associated experiment information of the experiment comprising the first associated experiment information of the experiment and the gating strategy (or a representation of the gating strategy) in the first format; and transmit the second associated experiment information of the experiment to the acquisition system, and the indication of the gating strategy has been generated comprises the second associated experiment information. In some embodiments, the processor is programmed by the processor to: generate a particle analyzer configuration that comprises the first associated experiment information and represents the gating strategy (e.g., the gating strategy or the representation of the gating strategy); and transmit the particle analyzer configuration to the acquisition system, wherein the indication of the gating strategy has been generated comprises the particle analyzer configuration.

In some embodiments, to generate the gating strategy (or the representation of the gating strategy), the processor is programmed by the executable instructions to: use a gating method of an analysis tool to generate the gating strategy (or the representation of the gating strategy) based on (1) the measurements of the parameters of the first plurality of particles of the sample associated with the experiment, and (2) the reference sorting criteria for the first plurality of particles of the sample associated with the experiment. The second associated experiment information can comprise the gating method, one or more input parameters of the gating method, one or more output parameters of the gating method, and/or the analysis tool. The particle analyzer configuration can comprise the gating method, one or more input parameters of the gating method, one or more output parameters of the gating method, and/or the analysis tool. To generate the second associated experiment information, the processor can be programmed by the executable instructions to: generate a file comprising the first associated experiment information, the gating strategy, the second associated experiment information, the gating method for generating the gating strategy, one or more input parameters of the gating method, one or more output parameters of the gating method, and/or the analysis tool implementing the gating method. The processor can be programmed by the executable instructions to: generate a representation of the gating strategy (e.g., in a format readable by the acquisition system) form the gating strategy.

In some embodiments, the gating strategy (or the representation of the gating strategy) comprises a plurality of gates corresponding to pairs of the parameters. The reference sorting criteria can comprise a first plurality of particles of interest selected from the first plurality of particles. To generate the gating strategy (or the representation of the gating strategy), the processor can be programmed by the executable instructions to: determine the number of the plurality of gates based on a measure of distinguishing the first plurality of particles of interest from the remaining particles of first plurality of particles using the gating strategy (or the representation of the gating strategy), wherein the plurality of gates correspond to some or all of the parameters; and generate a plurality of polygons based on the measurements of the parameters of the first plurality particles of the sample, the sorting criteria, and the plurality of gates, wherein at least two of the plurality of polygons comprise polygons of different shapes, wherein the number of the plurality of gates and the number of the plurality of polygons are identical. The measure can comprise a purity measure and a yield measure of distinguishing the first plurality of particles of interest from the remaining particles of the first plurality of particles using the gating strategy (or the representation of the gating strategy). To generate the plurality of polygons, the processor can be programmed by the executable instructions to: generate the plurality of polygons enclosing some or all of the plurality of particles of interest.

In some embodiments, the acquisition system is programmed to: generate the first associated experiment information in the first format from a second format; and generate the second associated experiment information in the second format from the first format. The first associated experiment information in the second format can comprise an identifier of the particle analyzer, and wherein the first associated experiment information in the first format comprises an identifier of another particle analyzer. The second associated experiment information in the second format can comprise an identifier of the particle analyzer, and wherein the second associated experiment information in the first format comprises an identifier of another particle analyzer. The processor can be programmed by the executable instructions to, prior to generating the gating strategy (or the representation of the gating strategy): determine the first associated experiment information is in the first format.

In some embodiments, the first associated experiment information in the first format comprises an identifier of the particle analyzer. The first associated experiment information in the first format can comprise an identifier of the acquisition system. The acquisition system can be programmed to: generate a particle analyzer configuration for the particle analyzer that represents the gating strategy (e.g., the gating strategy or the representation of the gating strategy); and transmit the particle analyzer configuration to the particle analyzer. The particle analyzer can be programmed to: collecting measurements of the parameters of a second plurality of particles of the sample associated with the experiment based at least in part on the particle analyzer configuration. The reference sorting criteria can comprise gating information identifying a plurality of values of the parameters of the first plurality of particles of the sample for distinguishing a first plurality of particles of interest from remaining particles of the first plurality of particles.

In some embodiments, to receive the reference sorting criteria for the first plurality of particles of the sample, the processor is programmed by the executable instructions to: receive a selection of a first plurality of particles of interest from the first plurality of particles of interest. To receive the selection of the first plurality of particles of interest, the processor can be programmed by the executable instructions to: display a plurality of images corresponding to the measurements of the parameters of the first plurality of particles of the sample associated with the experiment.

In some embodiments, the measurements of the parameters of the first plurality of particles of the sample comprise measurements of light emitted fluorescently by the first plurality of particles. The light emitted fluorescently by the first plurality of particles can comprise light emitted fluorescently by cellular component binding reagents bound to the first plurality of particles.

Disclosed herein include embodiments of a method for sorting a plurality of particles of a sample. In some embodiments, the method comprises: under control of a processor (e.g., a hardware processor, and a processor of a virtual machine): receiving (1) measurements of parameters of a first plurality of particles of a sample associated with an experiment collected by a particle analyzer, and (2) first associated experiment information of the experiment in a first format. The method can comprise: receiving reference sorting criteria for the first plurality of particles of the sample associated with the experiment. The method can comprise: generating a gating strategy (or a representation of the gating strategy) based on (1) the measurements of the parameters of the first plurality of particles of the sample associated with the experiment, and (2) the reference sorting criteria for the first plurality of particles of the sample associated with the experiment. The method can comprise: generating second associated experiment information of the experiment comprising the first associated experiment information of the experiment and the gating strategy (or a representation of the gating strategy) in the first format. The method can comprise: causing the particle analyzer to collect measurements of the parameters of a second plurality of particles of the sample associated with the experiment based at least in part on a particle analyzer configuration that represents the gating strategy (e.g., the gating strategy or the representation of the gating strategy) and generated from the second associated experiment information of the experiment.

Disclosed herein include embodiments of a method for sorting a plurality of particles of a sample. In some embodiments, the method comprises: under control of a processor (e.g., a hardware processor, and a processor of a virtual machine): receiving (1) measurements of parameters of a first plurality of particles of a sample associated with an experiment collected by a particle analyzer, and (2) first associated experiment information of the experiment in a first format; receiving reference sorting criteria for the first plurality of particles of the sample associated with the experiment; and generating a gating strategy based on (1) the measurements of the parameters of the first plurality of particles of the sample associated with the experiment, and (2) the reference sorting criteria for the first plurality of particles of the sample associated with the experiment. In some embodiments, the method comprises: generating second associated experiment information of the experiment comprising the first associated experiment information of the experiment and the gating strategy (or a representation of the gating strategy) in the first format; and causing the particle analyzer to collect measurements of the parameters of a second plurality of particles of the sample associated with the experiment based at least in part on a particle analyzer configuration that represents the gating strategy (e.g., the gating strategy or the representation of the gating strategy) and generated from the second associated experiment information of the experiment. The method can comprise: generating the particle analyzer configuration that represents the gating strategy (e.g., the gating strategy or the representation of the gating strategy) from the second associated experiment information of the experiment; and transmitting the particle analyzer configuration to the particle analyzer. In some embodiments, the method can comprise: generating a particle analyzer configuration comprising the first associated experiment information and represents the gating strategy (e.g., the gating strategy or the representation of the gating strategy) in the first format; and causing the particle analyzer to collect measurements of the parameters of a second plurality of particles of the sample associated with the experiment based at least in part on a particle analyzer configuration. The method can comprise: transmitting the particle analyzer configuration to the particle analyzer.

In some embodiments, generating the gating strategy (or the representation of the gating strategy) comprises generating, using a gating method and/or an analysis tool implementing the gating method, the gating strategy (or the representation of the gating strategy) based on (1) the measurements of the parameters of the first plurality of particles of the sample associated with the experiment, and (2) the reference sorting criteria for the first plurality of particles of the sample associated with the experiment. The second associated experiment information can comprise the gating method, one or more input parameters of the gating method, one or more output parameters of the gating method, and/or the analysis tool. The particle analyzer configuration can comprise the gating method, one or more input parameters of the gating method, one or more output parameters of the gating method, and/or the analysis tool. Generating the second associated experiment information can comprise: generating a file comprising the first associated experiment information, the gating strategy, the second associated experiment information, the gating method for generating the gating strategy, one or more input parameters of the gating method, one or more output parameters of the gating method, and/or the analysis tool implementing the gating method. The method can comprise generating the representation of the gating strategy from the gating strategy.

In some embodiments, the gating strategy (or the representation of the gating strategy) comprises a plurality of gates corresponding to pairs of the parameters. The reference sorting criteria can comprise a first plurality of particles of interest selected from the first plurality of particles. Generating the gating strategy (or the representation of the gating strategy) can comprise: determining the number of the plurality of gates based on a measure of distinguishing the first plurality of particles of interest from the remaining particles of first plurality of particles using the gating strategy (or the representation of the gating strategy), wherein the plurality of gates correspond to some or all of the parameters; and generating a plurality of polygons based on the measurements of the parameters of the first plurality particles of the sample, the sorting criteria, and the plurality of gates, wherein at least two of the plurality of polygons comprise polygons of different shapes, wherein the number of the plurality of gates and the number of the plurality of polygons are identical. The measure can comprise a purity measure and a yield measure of distinguishing the first plurality of particles of interest from the remaining particles of the first plurality of particles using the gating strategy (or the representation of the gating strategy). Generating the plurality of polygons can comprise generating the plurality of polygons enclosing some or all of the plurality of particles of interest.

In some embodiments, the method can comprise: transmitting (1) the measurements of the parameters of the first plurality of particles of the sample associated with the experiment, and (2) the first associated experiment information of the experiment in the first format to an analysis system (e.g., a software as a service (SaaS) system), wherein receiving the reference sorting criteria comprises receiving, by the analysis system, reference sorting criteria for the first plurality of particles of the sample associated with the experiment, wherein generating the gating strategy (or the representation of the gating strategy) comprises generating, using the analysis system, the gating strategy (or the representation of the gating strategy) based on (1) the measurements of the parameters of the first plurality of particles of the sample associated with the experiment, and (2) the reference sorting criteria for the first plurality of particles of the sample associated with the experiment, and wherein generating the second associated experiment information comprises generating, using the analysis system, the second associated experiment information of the experiment comprising the first associated experiment information of the experiment and the gating strategy (or a representation of the gating strategy) in the first format.

In some embodiments, the method comprises: receiving the first associated experiment information in a second format; generating the first associated experiment information in the first format from the first associated experiment information in the second format; and generating the second associated experiment information in the second format from the second associated experiment information the first format. The first associated experiment information in the second format can comprise an identifier of the particle analyzer, and wherein the first associated experiment information in the first format comprises an identifier of another particle analyzer. The second associated experiment information in the second format can comprise an identifier of the particle analyzer, and wherein the second associated experiment information in the first format comprises an identifier of another particle analyzer. The method can comprise: determining the first associated experiment information is in the first format. Determining the first associated experiment information is in the first format can comprise determining, by the analysis system, the first associated experiment information is in the first format.

In some embodiments, the first associated experiment information in the first format comprises an identifier of the particle analyzer. The first associated experiment information in the first format can comprise an identifier of the acquisition system. The reference sorting criteria can comprise gating information identifying a plurality of values of the parameters of the first plurality of particles of the sample for distinguishing a first plurality of particles of interest from remaining particles of the first plurality of particles.

In some embodiments, receiving the reference sorting criteria for the first plurality of particles of the sample comprises receiving a selection of a first plurality of particles of interest from the first plurality of particles of interest. Receiving the selection of the first plurality of particles of interest can comprise displaying a plurality of images corresponding to the measurements of the parameters of the first plurality of particles of the sample associated with the experiment.

In some embodiments, the measurements of the parameters of the first plurality of particles of the sample comprise measurements of light emitted fluorescently by the first plurality of particles. The light emitted fluorescently by the first plurality of particles can comprise light emitted fluorescently by cellular component binding reagents bound to the first plurality of particles.

DETAILED DESCRIPTION

Figure 1:
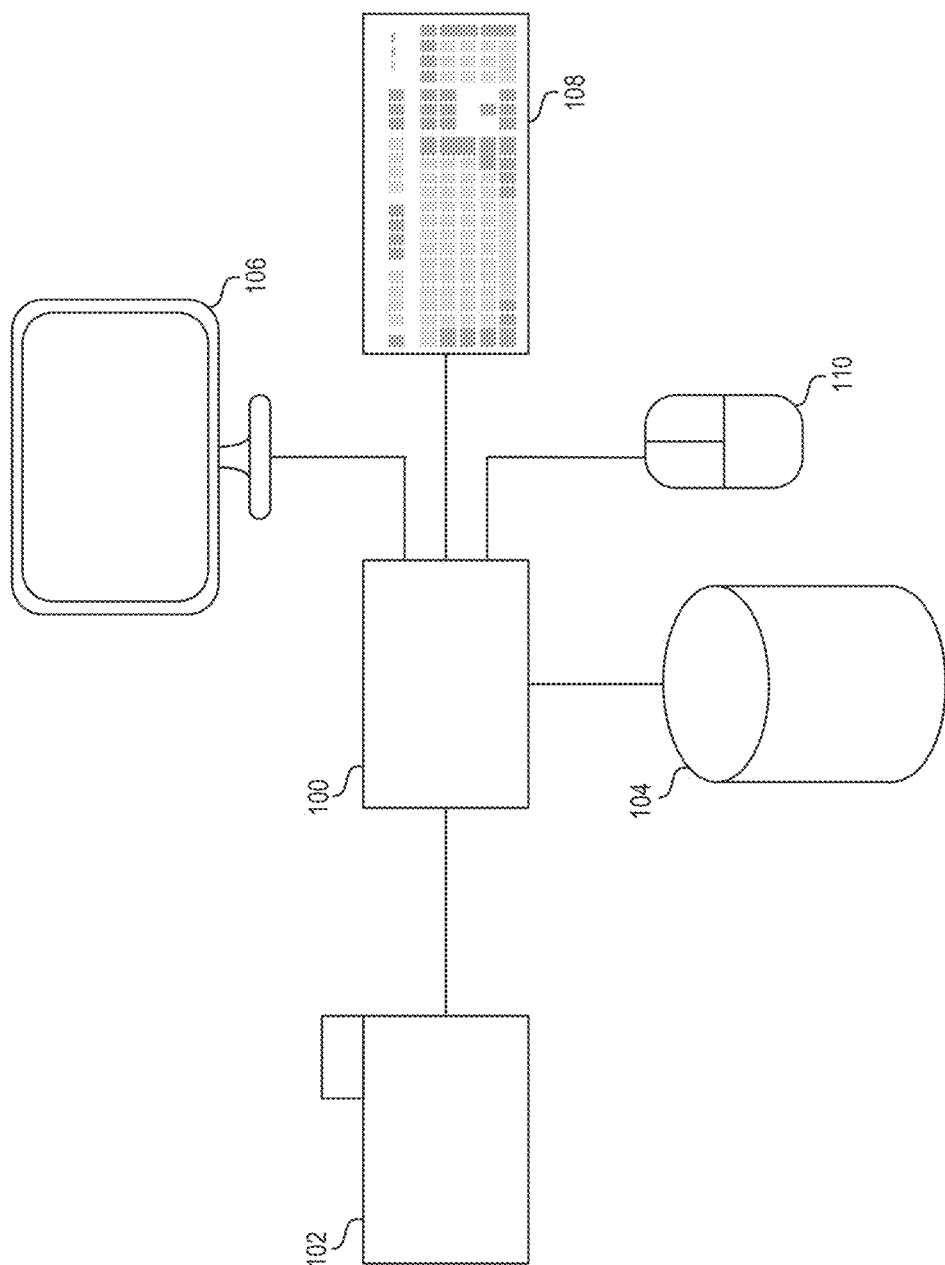
FIG. 1 shows a functional block diagram for one example of a sorting control system for analyzing and displaying biological events.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

Particle analyzers, such as flow and scanning cytometers, are analytical tools that enable the characterization of particles on the basis of electro-optical measurements such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components can be simultaneously detected by using spectrally distinct fluorescent dyes to label the different particles or components. In some implementations, a multiplicity of photodetectors, one for each of the scatter parameters to be measured, and one or more for each of the distinct dyes to be detected are included in the analyzer. For example, some embodiments include spectral configurations where more than one sensor or detector is used per dye. The data obtained comprise the signals measured for each of the light scatter detectors and the fluorescence emissions.

Particle analyzers can further comprise means for recording the measured data and analyzing the data. For example, data storage and analysis can be carried out using a computer connected to the detection electronics. For example, the data can be stored in tabular form, where each row corresponds to data for one particle, and the columns correspond to each of the measured features. The use of standard file formats, such as a Flow Cytometry Standard ("FCS") file format, for storing data from a particle analyzer facilitates analyzing data using separate programs and/or machines. Using current analysis methods, the data typically are displayed in 1-dimensional histograms or 2-dimensional (2D) plots for ease of visualization, but other methods can be used to visualize multidimensional data.

The parameters measured using, for example, a flow cytometer typically include light scattered by the particle in a narrow angle along a mostly forward direction (referred to as forward scatter (FSC)), light that is scattered by the particle in an orthogonal direction to the excitation laser (referred to as side scatter (SSC)), and the light emitted from fluorescent molecules in one or more detectors that measure signal over a range of spectral wavelengths, or by the fluorescent dye that is primarily detected in that specific detector or array of detectors. Different cell types can be identified by their light scatter characteristics and fluorescence emissions resulting from labeling various cell proteins or other constituents with fluorescent dye-labeled antibodies or other fluorescent probes.

Both flow and scanning cytometers are commercially available from, for example, BD Biosciences (San Jose, Calif.). Flow cytometry is described in, for example, Landy et al. (eds.), Clinical Flow Cytometry, Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91, Humana Press (1997); and Practical Shapiro, Flow Cytometry, 4th ed., Wiley-Liss (2003); each of which is incorporated herein by reference. Fluorescence imaging microscopy is described in, for example, Pawley (ed.), Handbook of Biological Confocal Microscopy, 2nd Edition, Plenum Press (1989), incorporated herein by reference.

The data obtained from an analysis of cells (or other particles) by multi-color flow cytometry are multidimensional, where each cell corresponds to a point in a multidimensional space defined by the parameters measured. Populations of cells or particles can be identified as clusters of points in the data space. The identification of clusters and, thereby, populations can be carried out manually by drawing a gate around a population displayed in one or more 2-dimensional plots, referred to as "scatter plots" or "dot plots," of the data. Alternatively, clusters can be identified, and gates that define the limits of the populations, can be determined automatically. Examples of methods for automated gating have been described in, for example, U.S. Pat. Nos. 4,845,653; 5,627,040; 5,739,000; 5,795,727; 5,962,238; 6,014,904; 6,944,338; and 8,990,047; each of which is incorporated herein by reference.

Flow cytometry is a valuable method for the analysis and isolation of biological particles such as cells and constituent molecules. As such it has a wide range of diagnostic and therapeutic applications. The method utilizes a fluid stream to linearly segregate particles such that they can pass, single file, through a detection apparatus. Individual cells can be distinguished according to their location in the fluid stream and the presence of detectable markers. Thus, a flow cytometer can be used to characterize and produce a diagnostic profile of a population of biological particles.

Isolation of biological particles has been achieved by adding a sorting or collection capability to flow cytometers. Particles in a segregated stream, detected as having one or more desired characteristics, can be individually isolated from the sample stream by mechanical or electrical separation. This method of flow sorting has been used to sort cells of different types, to separate sperm bearing X and Y chromosomes for animal breeding, to sort chromosomes for genetic analysis, and to isolate particular organisms from complex biological population.

Gating can be used to classify and help make sense of the large quantity of data that can be generated from a sample. Given the large quantities of data presented for a given sample, there exists a need to efficiently control the graphical display of the data.

Fluorescence-activated particle sorting or cell sorting is a specialized type of flow cytometry. Fluorescence-activated particle sorting or cell sorting provides a method for sorting a heterogeneous mixture of particles into one or more containers, one cell at a time, based upon the specific light scattering and fluorescence characteristics of each cell. It records fluorescent signals from individual cells, and physically separates cells of particular interest. The acronym FACS is trademarked and owned by Becton, Dickinson and Company (Franklin Lakes, NJ) and can be used to refer to devices for performing fluorescence-activated particle sorting or cell sorting.

The particle suspension is placed near the center of a narrow, rapidly flowing stream of liquid. The flow is arranged so that on the average there is a large separation between particles relative to their diameter as they arrive stochastically (e.g., a Poisson process) into the detection region. A vibrating mechanism can cause the emerging fluid stream to break off in a stable manner into individual droplets that contain particles previously characterized in the detection region. The system can generally be adjusted so that there is a low probability of more than one particle being in a droplet. If a particle is classified to be collected, a charge can be applied to the flow cell and emerging stream during the period of time one or more drops form and break off from the stream. These charged droplets then move through an electrostatic deflection system that diverts droplets into target containers based upon the charge applied to the droplet.

A sample can include thousands if not millions of cells. Cells can be sorted to purify a sample to the cells of interest. The sorting process can generally identify three varieties of cells: cells of interest, cells which are not of interest, and cells which cannot be identified. In order to sort cells with high purity (e.g., high concentration of cells of interest), droplet generating cell sorters can abort the sort electronically if the desired cells are too close to another unwanted cell and thereby reduce contamination of the sorted populations by any inadvertent inclusion of an unwanted particle within the droplet containing the particle of interest.

Disclosed herein include embodiments of an acquisition system for sorting a plurality of particles of a sample. In some embodiments, the acquisition system comprises: non-transitory memory configured to store executable instructions; and a hardware processor, or a processor of a virtual machine, in communication with the non-transitory memory, the hardware processor programmed by the executable instructions to: transmit (1) measurements of parameters of a first plurality of particles of a sample associated with an experiment collected by a particle analyzer, and (2) first associated experiment information of the experiment in a first format to an analysis system (e.g., a software as a service (SaaS) system). The hardware processor can be programmed by the executable instructions to: receive second associated experiment information of the experiment from the analysis system in the first format. The analysis system can be programmed to: receive reference sorting criteria for the first plurality of particles of the sample associated with the experiment; generate a gating strategy based on (1) the measurements of the parameters of the first plurality of particles of the sample associated with the experiment, and (2) the reference sorting criteria for the first plurality of particles of the sample associated with the experiment; and generate the second associated experiment information of the experiment comprising the first associated experiment information of the experiment and the gating strategy (or a representation of the gating strategy) in the first format. Alternatively or additionally, the second associated experiment information received is generated by the analysis system by: receiving reference sorting criteria for the first plurality of particles of the sample associated with the experiment; generating a gating strategy based on (1) the measurements of the parameters of the first plurality of particles of the sample associated with the experiment, and (2) the reference sorting criteria for the first plurality of particles of the sample associated with the experiment; and generating the second associated experiment information of the experiment comprising the first associated experiment information of the experiment and the gating strategy in the first format. Alternatively or additionally, the second associated experiment information received is indicative the analysis system has: received reference sorting criteria for the first plurality of particles of the sample associated with the experiment; generated a gating strategy based on (1) the measurements of the parameters of the first plurality of particles of the sample associated with the experiment, and (2) the reference sorting criteria for the first plurality of particles of the sample associated with the experiment; and generated the second associated experiment information of the experiment comprising the first associated experiment information of the experiment and the gating strategy (or a representation of the gating strategy) in the first format. The hardware processor can be programmed by the executable instructions to: transmit a particle analyzer configuration that represents the gating strategy and generated from the second associated experiment information of the experiment to the particle analyzer.

Disclosed herein includes embodiments of an analysis system (e.g., a software as a service (SaaS) system) for generating a gating strategy. The analysis system can comprise: non-transitory memory configured to store executable instructions; and a hardware processor, or a processor of a virtual machine, in communication with the non-transitory memory, the hardware processor programmed by the executable instructions to: receive, from an acquisition system in communication with a particle analyzer, (1) measurements of parameters of a first plurality of particles of a sample associated with an experiment, and (2) first associated experiment information of the experiment in a first format. The hardware processor can be programmed by the executable instructions to: receive reference sorting criteria for the first plurality of particles of the sample associated with the experiment. The hardware processor can be programmed by the executable instructions to: generate a gating strategy based on (1) the measurements of the parameters of the first plurality of particles of the sample associated with the experiment, and (2) the reference sorting criteria for the first plurality of particles of the sample associated with the experiment. The hardware processor can be programmed by the executable instructions to: generate second associated experiment information of the experiment comprising the first associated experiment information of the experiment and the gating strategy (or a representation of the gating strategy) in the first format. The hardware processor can be programmed by the executable instructions to: transmit the second associated experiment information of the experiment to the acquisition system.

Disclosed herein include embodiments of a method for sorting a plurality of particles of a sample. In some embodiments, the method comprises: under control of a hardware processor, or a processor of a virtual machine: receiving (1) measurements of parameters of a first plurality of particles of a sample associated with an experiment collected by a particle analyzer, and (2) first associated experiment information of the experiment in a first format. The method can comprise: receiving reference sorting criteria for the first plurality of particles of the sample associated with the experiment. The method can comprise: generating a gating strategy based on (1) the measurements of the parameters of the first plurality of particles of the sample associated with the experiment, and (2) the reference sorting criteria for the first plurality of particles of the sample associated with the experiment. The method can comprise: generating second associated experiment information of the experiment comprising the first associated experiment information of the experiment and the gating strategy (or a representation of the gating strategy) in the first format. The method can comprise: causing the particle analyzer to collect measurements of the parameters of a second plurality of particles of the sample associated with the experiment based at least in part on a particle analyzer configuration that represents the gating strategy and generated from the second associated experiment information of the experiment.

Definitions

As used herein, the terms set forth with particularity below have the following definitions. If not otherwise defined in this section, all terms used herein have the meaning commonly understood by a person skilled in the arts to which this invention belongs.

As used herein, "system," "instrument," "apparatus," and "device" generally encompass both the hardware (e.g., mechanical and electronic) and, in some implementations, associated software (e.g., specialized computer programs for graphics control) components.

As used herein, an "event" or "event data" generally refers to the data (e.g., assembled packet of data) measured from a single particle, such as cells or synthetic particles. Typically, the data measured from a single particle include a number of parameters or features, including one or more light scattering parameters or features, and at least one other parameter or feature derived from fluorescence detected from the particle such as the intensity of the fluorescence. Thus, each event can be represented as a vector of parameter and feature measurements, wherein each measured parameter or feature corresponds to one dimension of the data space. In some embodiments, the data measured from a single particle include image, electric, temporal, or acoustic data. An event can be associated with an experiment, an assay, or a sample source which can be identified in association with the measurement data.

As used herein, a "population", or "subpopulation" of particles, such as cells or other particles, generally refers to a group of particles that possess properties (for example, optical, impedance, or temporal properties) with respect to one or more measured parameters such that measured parameter data form a cluster in the data space. Thus, populations can be recognized as clusters in the data. Conversely, each data cluster generally is interpreted as corresponding to a population of a particular type of cell or particle, although clusters that correspond to noise or background typically also are observed. A cluster can be defined in a subset of the dimensions, e.g., with respect to a subset of the measured parameters, which corresponds to populations that differ in only a subset of the measured parameters or features extracted from the measurements of the cell or particle.

As used herein, a "gate" generally refers to a classifier boundary identifying a subset of data of interest. In cytometry, a gate can bound a group of events of particular interest. As used herein, "gating" generally refers to the process of classifying the data using a defined gate for a given set of data, where the gate can be one or more regions of interest combined with Boolean logic.

Specific examples of various embodiments and systems in which they are implemented are described further below.

Sorting Control System

FIG. 1 shows a functional block diagram for one example of a sorting control system, such as an analytics controller 100, for analyzing and displaying biological events. An analytics controller 100 can be configured to implement a variety of processes for controlling graphic display of biological events.

A particle analyzer or sorting system 102 can be configured to acquire biological event data. For example, a flow cytometer can generate flow cytometric event data. The particle analyzer 102 can be configured to provide biological event data to the analytics controller 100. A data communication channel can be included between the particle analyzer 102 and the analytics controller 100. The biological event data can be provided to the analytics controller 100 via the data communication channel.

The analytics controller 100 can be configured to receive biological event data from the particle analyzer 102. The biological event data received from the particle analyzer 102 can include flow cytometric event data. The analytics controller 100 can be configured to provide a graphical display including a first plot of biological event data to a display device 106. The analytics controller 100 can be further configured to render a region of interest as a gate around a population of biological event data shown by the display device 106, overlaid upon the first plot, for example. In some embodiments, the gate can be a logical combination of one or more graphical regions of interest drawn upon a single parameter histogram or bivariate plot.

The analytics controller 100 can be further configured to display the biological event data on the display device 106 within the gate differently from other events in the biological event data outside of the gate. For example, the analytics controller 100 can be configured to render the color of biological event data contained within the gate to be distinct from the color of biological event data outside of the gate. The display device 106 can be implemented as a monitor, a tablet computer, a smartphone, or other electronic device configured to present graphical interfaces.

The analytics controller 100 can be configured to receive a gate selection signal identifying the gate from a first input device. For example, the first input device can be implemented as a mouse 110. The mouse 110 can initiate a gate selection signal to the analytics controller 100 identifying the gate to be displayed on or manipulated via the display device 106 (e.g., by clicking on or in the desired gate when the cursor is positioned there). In some implementations, the first device can be implemented as the keyboard 108 or other means for providing an input signal to the analytics controller 100 such as a touchscreen, a stylus, an optical detector, or a voice recognition system. Some input devices can include multiple inputting functions. In such implementations, the inputting functions can each be considered an input device. For example, as shown in FIG. 1, the mouse 110 can include a right mouse button and a left mouse button, each of which can generate a triggering event.

The triggering event can cause the analytics controller 100 to alter the manner in which the data is displayed, which portions of the data is actually displayed on the display device 106, and/or provide input to further processing such as selection of a population of interest for particle sorting.

In some embodiments, the analytics controller 100 can be configured to detect when gate selection is initiated by the mouse 110. The analytics controller 100 can be further configured to automatically modify plot visualization to facilitate the gating process. The modification can be based on the specific distribution of biological event data received by the analytics controller 100.

The analytics controller 100 can be connected to a storage device 104. The storage device 104 can be configured to receive and store biological event data from the analytics controller 100. The storage device 104 can also be configured to receive and store flow cytometric event data from the analytics controller 100. The storage device 104 can be further configured to allow retrieval of biological event data, such as flow cytometric event data, by the analytics controller 100.

A display device 106 can be configured to receive display data from the analytics controller 100. The display data can comprise plots of biological event data and gates outlining sections of the plots. The display device 106 can be further configured to alter the information presented according to input received from the analytics controller 100 in conjunction with input from the particle analyzer 102, the storage device 104, the keyboard 108, and/or the mouse 110.

In some implementations the analytics controller 100 can generate a user interface to receive example events for sorting. For example, the user interface can include a control for receiving example events or example images. The example events or images or an example gate can be provided prior to collection of event data for a sample, or based on an initial set of events for a portion of the sample.

Particle Sorter System

A common flow sorting technique which can be referred to as "electrostatic cell sorting," utilizes droplet sorting in which a stream or moving fluid column containing linearly segregated particles is broken into drops and the drops containing particles of interest are electrically charged and deflected into a collection tube by passage through an electric field. Droplet sorting systems are capable of forming drops at a rate of 100,000 drops/second in a fluid stream that is passed through a nozzle having a diameter less than 100 micrometers. Droplet sorting typically requires that the drops break off from the stream at a fixed distance from the nozzle tip. The distance is normally on the order of a few millimeters from the nozzle tip and can be stabilized and maintained for an unperturbed fluid stream by oscillating the nozzle tip at a predefined frequency with an amplitude to hold the break-off constant. For example, in some embodiments, adjusting amplitude of a sine wave shaped voltage pulse at a given frequency holds the break-off stable and constant.

Typically, the linearly entrained particles in the stream are characterized as they pass through an observation point situated within a flow cell or cuvette, or just below the nozzle tip. Once a particle is identified as meeting one or more desired criteria, the time at which it will reach the drop break-off point and break from the stream in a drop can be predicted. Ideally, a brief charge is applied to the fluid stream just before the drop containing the selected particle breaks from the stream and then grounded immediately after the drop breaks off. The drop to be sorted maintains an electrical charge as it breaks off from the fluid stream, and all other drops are left uncharged. The charged drop is deflected sideways from the downward trajectory of the other drops by an electrical field and collected in a sample tube. The uncharged drops fall directly into a drain.

Figure 2A:
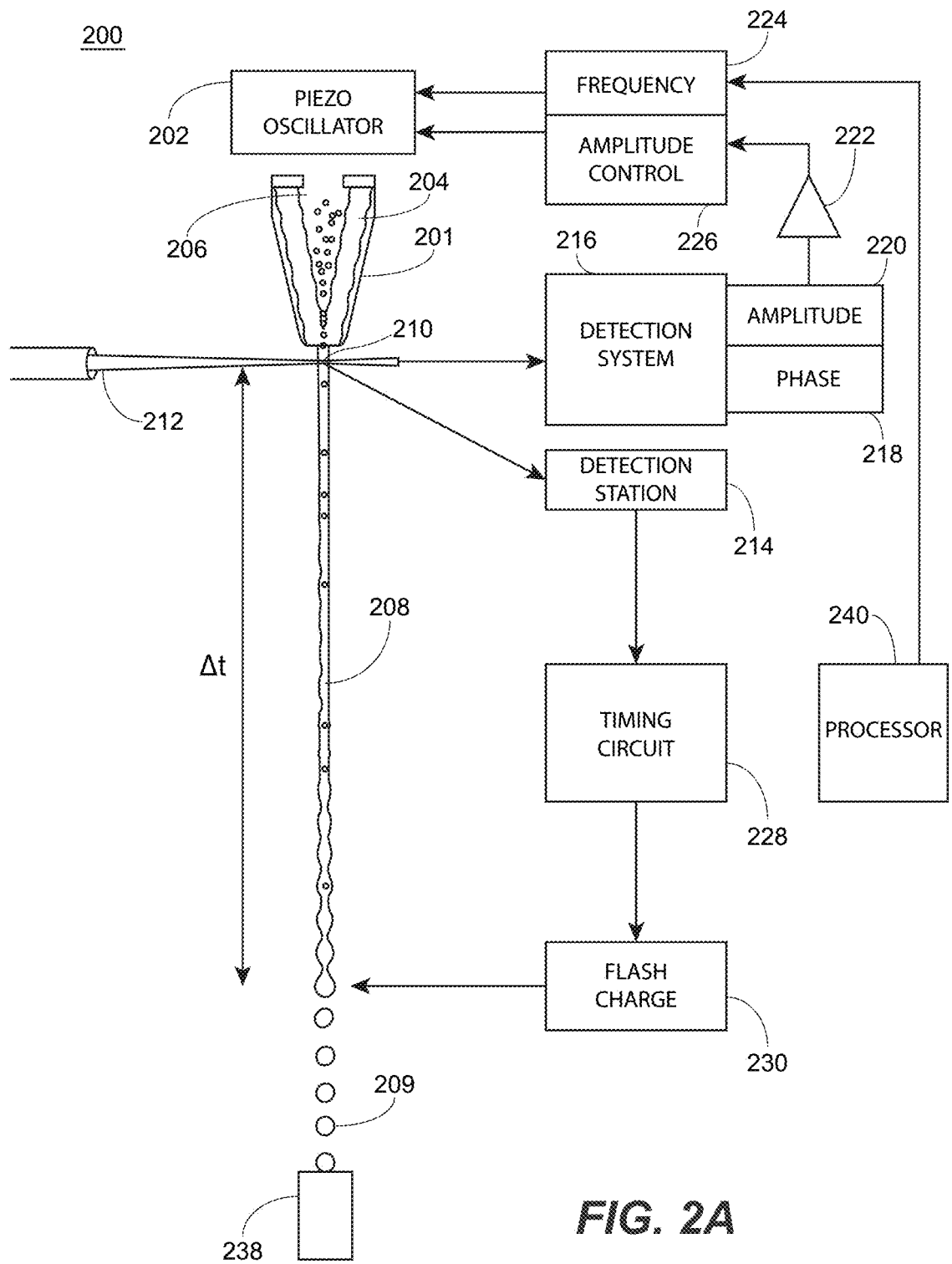
FIG. 2A is a schematic drawing of a particle sorter system, in accordance with one embodiment presented herein.

FIG. 2A is a schematic drawing of a particle sorter system 200 (e.g., the particle analyzer 102) in accordance with one embodiment presented herein. In some embodiments, the particle sorter system 200 is a cell sorter system. As shown in FIG. 2A, a drop formation transducer 202 (e.g., piezo-oscillator) is coupled to a fluid conduit 201 such as nozzle. Within fluid conduit 201, sheath fluid 204 hydrodynamically focuses a sample fluid 206 into a moving fluid column 208 (e.g. a stream). Within the moving fluid column 208, particles (e.g., cells) are lined up in single file to cross a monitored area 210 (e.g., where laser-stream intersect), irradiated by an irradiation source 212 (e.g., a laser). Vibration of the drop formation transducer 202 causes moving fluid column 208 to break into a plurality of drops 209.

In operation, a detection station 214 (e.g., an event detector) identifies when a particle of interest (or cell of interest) crosses the monitored area 210. Detection station 214 feeds into a timing circuit 228, which in turn feeds into a flash charge circuit 230. At a drop break off point, informed by a timed drop delay ($\Delta t$), a flash charge can be applied to the moving fluid column 208 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 2A, the drops can collected in a drain receptacle 238.

A detection system 216 (e.g. a drop boundary detector) serves to automatically determine the phase of a drop drive signal when a particle of interest passes the monitored area 210. An exemplary drop boundary detector is described in U.S. Pat. No. 7,679,039, which is incorporated herein by reference in its entirety. The detection system 216 allows the instrument to accurately calculate the place of each detected particle in a drop. The detection system 216 can feed into an amplitude signal 220 and/or phase 218 signal, which in turn feeds (via amplifier 222) into an amplitude control circuit 226 and/or frequency control circuit 224. The amplitude control circuit 226 and/or frequency control circuit 224, in turn, controls the drop formation transducer 202. The amplitude control circuit 226 and/or frequency control circuit 224 can be included in a control system.

In some implementations, sort electronics (e.g., the detection system 216, the detection station 214 and a processor 240) can be coupled with a memory configured to store the detected events and a sort decision based thereon. The sort decision can be included in the event data for a particle. In some implementations, the detection system 216 and the detection station 214 can be implemented as a single detection unit or communicatively coupled such that an event measurement can be collected by one of the detection system 216 or the detection station 214 and provided to the non-collecting element.

Figure 2B:
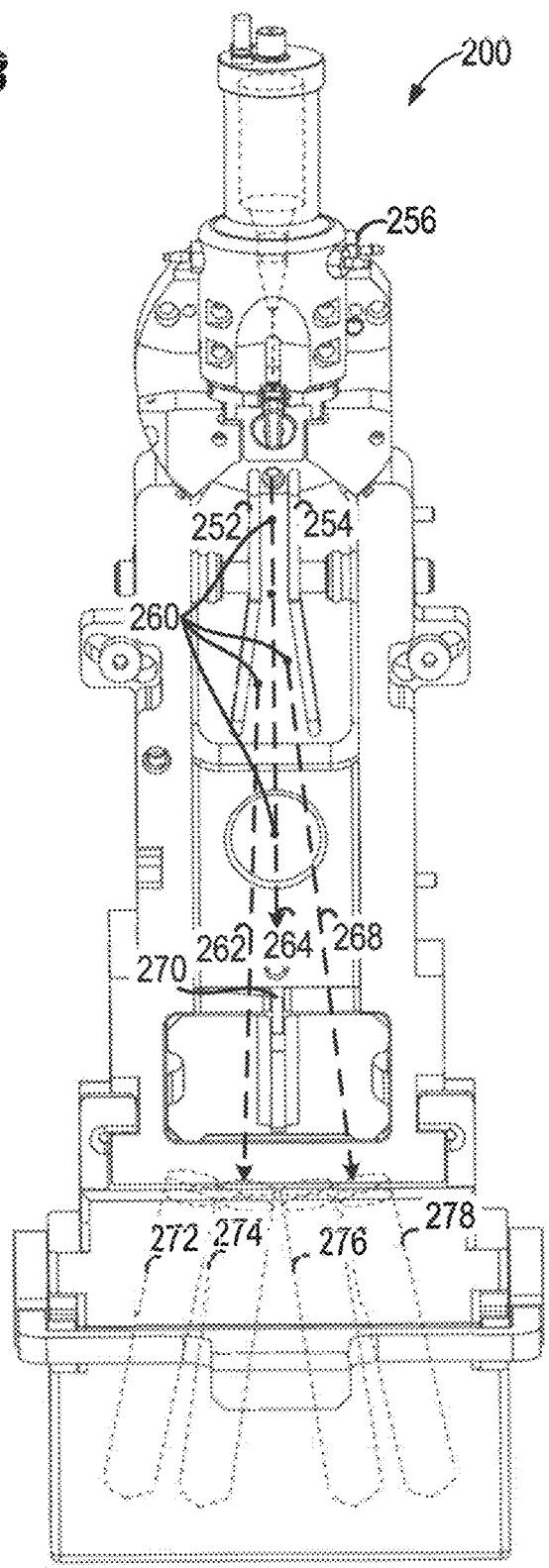
FIG. 2B is a schematic drawing of another particle sorter system, in accordance with one embodiment presented herein.

FIG. 2B is a schematic drawing of a particle sorter system, in accordance with one embodiment presented herein. The particle sorter system 200 shown in FIG. 2B, includes deflection plates 252 and 254. A charge can be applied via a stream-charging wire in a barb 256. This creates a stream of particles 260 for analysis. The particles can be illuminated with one or more light sources (e.g., lasers) to generate light scatter and fluorescence information. The information for a particle is analyzed such as by sorting electronics or other detection system (not shown in FIG. 2B). The deflection plates 252 and 254 can be independently controlled to attract or repel the charged droplet to guide the droplet toward a destination collection receptacle (e.g., one of 272, 274, 276, or 278). As shown in FIG. 2B, the deflection plates 252 and 254 can be controlled to direct a particle along a first path 262 toward the receptacle 274 or along a second path 268 toward the receptacle 278. If the particle is not of interest (e.g., does not exhibit scatter or illumination information within a specified sort range), deflection plates may allow the particle to continue along a flow path 264. Such uncharged droplets may pass into a waste receptacle such as via aspirator 270.

The sorting electronics can be included to initiate collection of measurements, receive fluorescence signals for particles, and determine how to adjust the deflection plates to cause sorting of the particles. Example implementations of the embodiment shown in FIG. 2B include the BD FACSAria™ line of flow cytometers commercially provided by Becton, Dickinson and Company (Franklin Lakes, NJ).

In some embodiments, one or more components described for the particle sorter system 200 can be used to analyze and characterize particles, with or without physically sorting the particles into collection vessels. Likewise, one or more components described below for the particle analysis system 300 (FIG. 3) can be used to analyze and characterize particles, with or without physically sorting the particles into collection vessels. For example, particles can be grouped or displayed in a tree that includes at least three groups as described herein, using one or more of the components of the particle sorter system 200 or particle analysis system 300.

Figure 3:
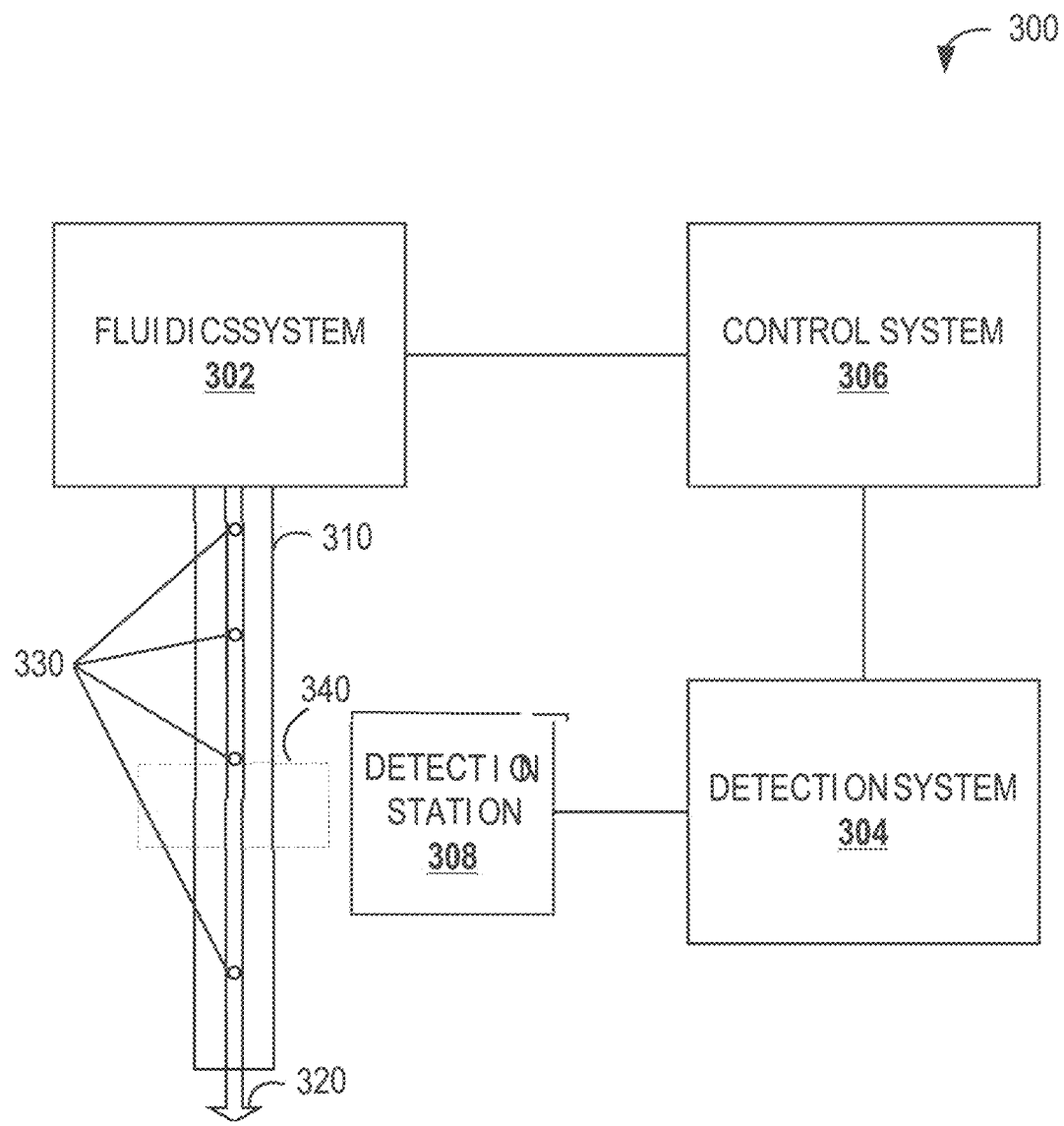
FIG. 3 shows a functional block diagram of a particle analysis system for computational based sample analysis and particle characterization.

FIG. 3 shows a functional block diagram of a particle analysis system for computational based sample analysis and particle characterization. In some embodiments, the particle analysis system 300 is a flow system. The particle analysis system 300 shown in FIG. 3 can be configured to perform, in whole or in part, the methods described herein such as. The particle analysis system 300 includes a fluidics system 302. The fluidics system 302 can include or be coupled with a sample tube 310 and a moving fluid column within the sample tube in which particles 330 (e.g. cells) of a sample move along a common sample path 320.

The particle analysis system 300 includes a detection system 304 configured to collect a signal from each particle as it passes one or more detection stations along the common sample path. A detection station 308 generally refers to a monitored area 340 of the common sample path. Detection can, in some implementations, include detecting light or one or more other properties of the particles 330 as they pass through a monitored area 340. In FIG. 3, one detection station 308 with one monitored area 340 is shown. Some implementations of the particle analysis system 300 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 304 is configured to collect a succession of such data points in a first time interval.

The particle analysis system 300 can also include a control system 306. The control system 306 can include one or more processors, an amplitude control circuit 226 and/or a frequency control circuit 224 as shown in FIG. 2B. The control system 206 shown can be operationally associated with the fluidics system 302. The control system 206 can be configured to generate a calculated signal frequency for at least a portion of the firsttime interval based on a Poisson distribution and the number of data points collected by the detection system 304 during the first time interval. The control system 306 can be further configured to generate an experimental signal frequency based on the number of data points in the portion of the first time interval. The control system 306 can additionally compare the experimental signal frequency with that of a calculated signal frequency or a predetermined signal frequency.

Sorting Configuration Generation System

Figure 4:
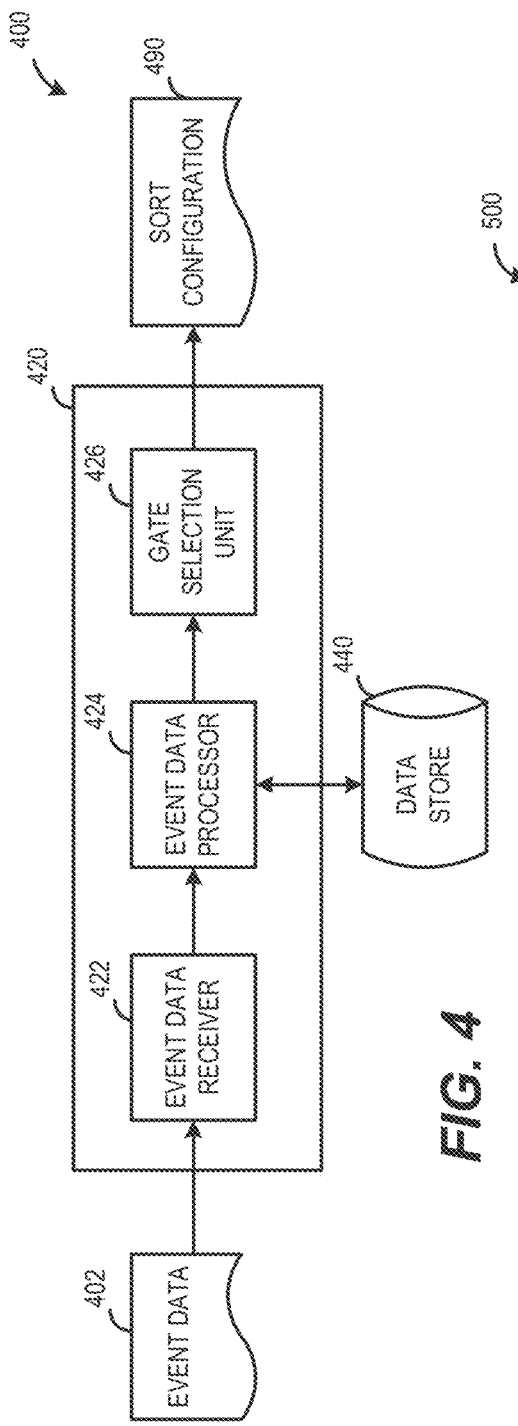
FIG. 4 is a diagram showing an example system to dynamically transform event data.

FIG. 4 is a diagram showing an example event selection system to dynamically identify event data such as for generating a sorting configuration. The event selection system 400 includes a selection device 420. The selection device 420 includes an event data receiver 422. The event data receiver 422 can receive event data 402 from a particle analyzer such as the particle analyzer 102 shown in FIG. 1. In some implementations, the event data 402 can be generated by a particle analyzer by received from, for example, an analytics workstation. For example, a user can provide the event data 402 which was obtained from a particle analyzer to the event data receiver 422. The event data receiver 422 can include a transceiver for wireless communication or a port for connecting to a wired network such as an Ethernet local area network or device such as via a Universal Serial Bus or THUNDERBOLT® connection.

The event data receiver 422 can provide at least a portion of the event data 402 to event data processor 424 included in the selection device 420. The event data processor 424 can identify a transformation to apply for the event data. The identification can include detecting a value in the event data such as an identifier for the assay or experiment. The available transformations can be stored in a data store 440 accessible by the event data processor 424. The transformation of the event data performed by the event data processor 424 can be a parametric or non-parametric transformation. In some implementations, the transformation can be specified by a device providing the event data 402. For example, an analysis workstation can submit a message requesting processing of the event data 402. The message can include a desired transformation (e.g., tSNE). In some implementations, the event data processing can be guided based on a user input. For example, the user can identify a transform to apply to the received event data.

The selection device 420 can include a gate selection unit 426. The gate selection unit 426 can receive, from an input device, a selection of events of interest. The selection can be referred to as a gate. The selection can define one or more ranges of parameter values for events of interest. The one or more ranges can be used by the gate selection unit 426 to generate a classifier or other sort configuration 490. The sort configuration 490 can be represented as a truth table or decision tree to identify those events associated with the gate. As described herein, the manual acquisition of a gate can be fraught with error and, in some instances, overlook significant parameters or potential hardware bottlenecks or efficiencies. Accordingly, the initial selection can be used as an example of the desired sort which can be adapted through further processing, without manual intervention, to optimize the search strategy.

Figure 5:
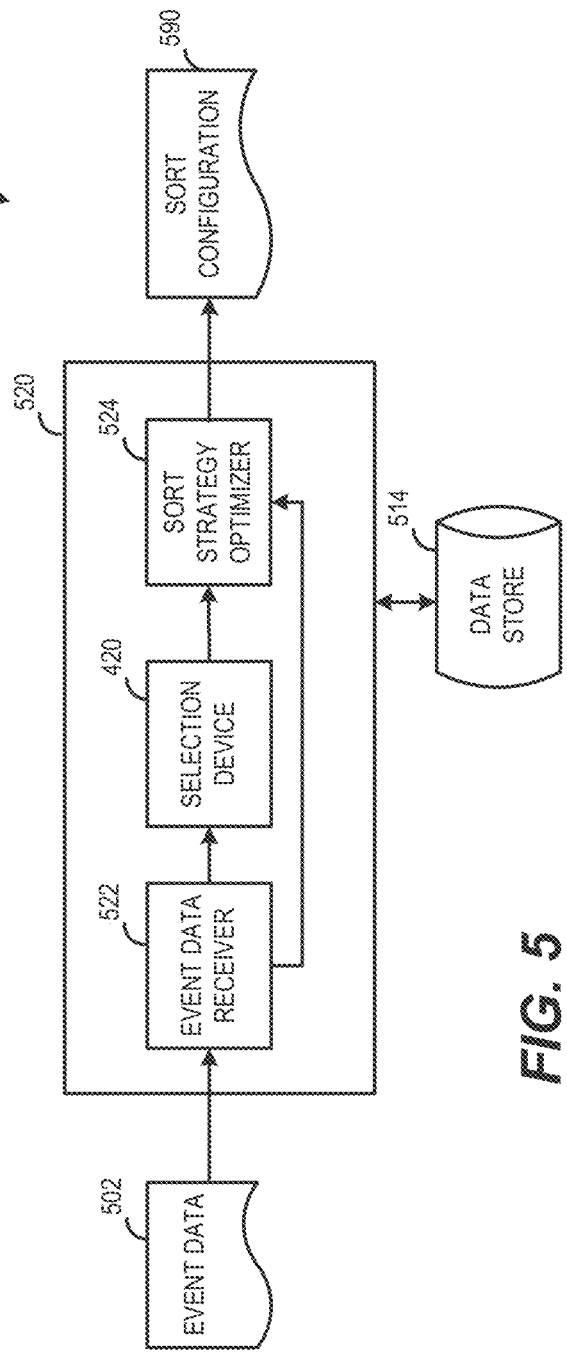
FIG. 5 is a diagram showing an example system to dynamically transform event data using a parametric machine learning transformation.

FIG. 5 is a diagram showing an example system for adaptive generation of a sort configuration. The adaptive sorting device 520 in FIG. 5 includes features to receive a selection from a selection device, such as the selection device 420, and then generate an optimized search strategy for assessing events.

The system 500 includes an adaptive sorting device 520. The adaptive sorting device 520 includes an event data receiver 522. The event data receiver 522 can receive event data 502 from a particle analyzer such as the particle analyzer 102 shown in FIG. 1. In some implementations, the event data 502 can be generated by a particle analyzer by received from, for example, an analytics workstation. For example, a user can provide the event data 502 which was obtained from a particle analyzer to the event data receiver 522. The event data receiver 522 can include a transceiver for wireless communication or a network port for connecting to a wired network such as an Ethernet local area network.

The event data receiver 522 can provide at least a portion of the event data 502 to the selection device 420. The selection device 420 can acquire an example sort configuration from a user. The example along with the received event data 502 can be provided to a sort strategy optimizer 524. The sort strategy optimizer 524 can iteratively generate a sort strategy that approximates the example sort configuration. A sort strategy can include a dynamic pipeline of event data transformations or selections. The available transformations or sorting steps can be stored in a data store 514 accessible by the sort strategy optimizer 524. Candidate strategies can include can include automatically detecting populations and scoring each event against relevant target and off-target populations (computational sort). The strategies can include approximation of transforms (non-parametric and parametric) using neural networks or other machine learning techniques. The strategies can include projecting target populations from a parameter space that is not sortable to one that is. As part of projecting the target populations, the system can identify computable parameters that, in combination, approximate parameters that are not easily computable. The strategies can include automatically extracting features from images or high-dimensional measurements including, for example, time series waveform data. One example of the automatic feature extraction is an auto-encoder neural network to learn relevant image features to be used in sorting decisions.

In some implementations, neural networks can be used for both feature generation and gating strategy generation. For feature generation, neural networks that receive raw image data as input and output metrics of what images "look" like. Other neural networks such as those that receive computed parameters (e.g., pulse area or height) as inputs and output new parameters. These new parameters provide a projection from the original parameter space to a new parameter space. For gating strategy generation, neural networks that receive a variety of parameters as input and output a single value which can be used for a sorting decision can be trained or used to generate a sorting decision.

Sorting Configuration Generation Method

Figure 6:
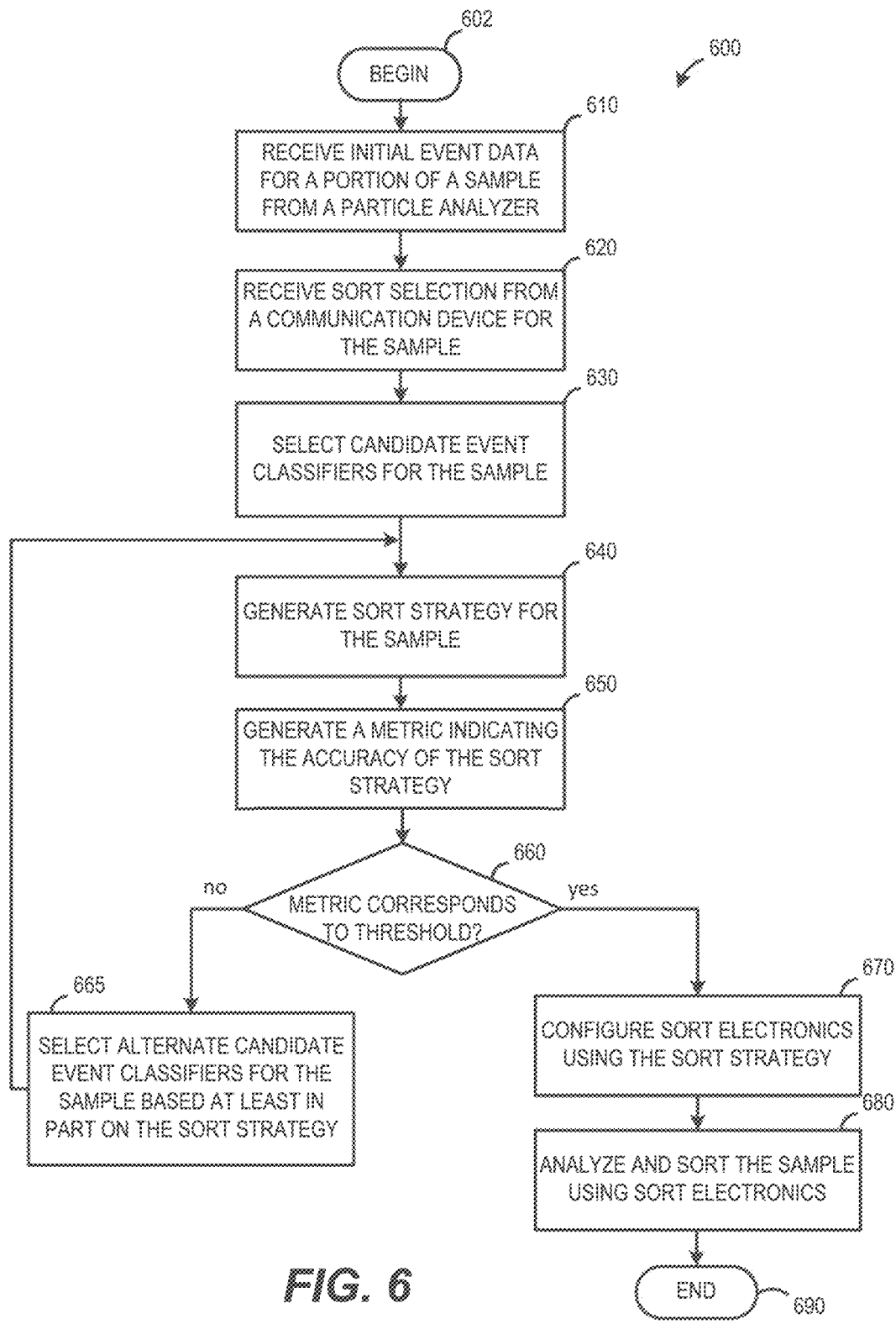
FIG. 6 is a process flow diagram depicting an example of a method of parametric machine learning transformation for multi-dimensional event data.

FIG. 6 is a process flow diagram depicting an example of a method of adaptive generation of an optimized sort strategy. The method 600 can be implemented in whole or in part by an adaptive sorting device, such as the adaptive sorting device 520 shown in FIG. 5.

The method 600 begins at block 602. At block 610, initial event data for a portion of a sample can be received. The event data can be collected after activating a particle analyzer to process the portion of the sample. Processing the sample can include measuring a property of particles such as graphic, electrical, temporal, or acoustic properties. In some implementations, the collection of the initial event data can be omitted and the method 600 can proceed from block 602 to block 620. This can be desirable in instances where the size of the sample is small. In such cases, to preserve the amount of sample available for sorting, the sort configuration can be assessed without consuming any of the sample.

At block 620, a sort selection for the sample is received from a communication device. The sort selection can represent an example of the population of events to be sorted. The sort selection can include a gate, an example image, or an example event. The sort selection can be identified relative to the event data for an initial portion of the sample received at block 610. For example, the researcher can draw a polygon on a graph of event data measurements to define a range of data values to be sorted. The polygon can define a gate which can be or be associated with a sort criterion.

The sort selection can serve as a reference for developing an optimized sort configuration. In some implementations, the sort selection can include information identifying the target sorting instrument or sort electronics. As discussed, different hardware can have different capabilities to implement a sort configuration. To ensure the sort configuration is adapted for the target hardware, the identity of the instrument can be considered.

At block 630, candidate event classifiers for the sample can be identified. The identification can include selecting event classifiers from a data store. The event classifiers can include neural network models, event data transformations, autoencoders, or other machine implemented elements for assessing event data. The selection can be based in part on a type of sample (e.g., blood, urine, tissue, etc.). The selection can be based in part on the particle analyzer that will be used to process the sample. The selection can be based in part on the sort selection received from the communication device. For example, if the sort selection includes an image, a graphics based classifier can be selected as a candidate event classifier. As another example, if the distribution of events in the sort selection features a statistically regular distribution, it can be desirable to use a Mahalanobis-based classifier.

In some implementations, a user interface can be provided to collect information specifying which classifiers to include in the candidate event classifiers. In some implementations, the system can consider the set of parameters and classifiers defined in a data store. The classifiers can be filtered based on, for example, how the sample events were identified by the user. As classifiers are identified, historical identification information can be used to identify common workflows that bundle together classifiers and parameters that are selected together for an experiment, target particle, particle analyzer generating the data, or other detectable property of an experiment or of the data generated during the experiment.

At block 640, a sort strategy can be generated using one or more of the candidate event classifiers. Generating a sort strategy can include sequencing one or more of the candidate event classifiers to form a pipeline for processing event data. Generating the sort strategy can include using the user's example gating strategy to inform how different classifiers and/or parameters should be linked together. For instance, if the user arrives at their example population using hierarchal gates then we can use a similar hierarchal structure. Another example would be if users used a transformed space at any point in determining their example data, the system can detect the transformation and generate an approximation of that transformation for the sort strategy. Yet another example is detecting high numbers of hierarchal gates as an attempt to draw manifolds in high dimensional spaces and employ tools like relationship preserving transformations or statistical models like Mahalanobis distance. As sort strategies are identified, historical strategy information can be used to identify common workflows that sequence particular identifiers for an experiment, target particle, particle analyzer generating the data, or other detectable property of an experiment or of the data generated during the experiment.

The sort strategy generated at block 640 can be assessed using a metric. At block 650, a metric indicating the accuracy of the sort strategy is generated. The metric can represent the accuracy (e.g., purity) of the sorted events from the sample. The metric can be generated based on a confidence of the classifiers included in the sort strategy. In some implementations, the metric can be generated based on a comparison of the sort selection with the sorting configuration generated by the sort strategy. One way the metric can be generated is using an F-measure for the sort strategy whereby the precision indicates a level of sort purity and the recall indicates a quantity or yield of the sorted sample. For example, the example events provided by a user can be divided into "training" and "testing" subsets. The division can be based on pseudorandom selection of a portion of the events. The training subset can be used to train a number of candidate gating strategies. These gating strategies can then be used to evaluate the testing subset. The results of this test will be used to generate an F-measure.

At block 660, a determination is made as to whether the metric for the sort strategy corresponds to a threshold. The threshold can be a predetermined configuration value indicating a minimum purity or yield for a sort strategy. If the determination at block 660 is affirmative, the generated sort strategy can be deemed adequate for the sample. In such instance, the method 600 proceeds to block 670.

At block 670, sort electronics (e.g., sorting circuitry) can be configured using the sort strategy generated at block 640. The configuration of the sort electronics can include storing a model or transformation included in the strategy in a memory location accessible to the sort electronics. The sort strategy can then be used to process event data for assessment against sorting criteria included in the sort strategy.

At block 680, the analyzer can assess and sort remaining portion(s) of the sample using the configured sort electronics. As a new event measurement is collected, the measurement can be processed, in real time, using the configured sort electronics and sorted to the specified vessel according to the sort configuration. For example, the deflection plates of the particle analyzer can be activated to direct a particle of interest into a specified collection tube.

The method 600 can end at block 690. However, it will be appreciated that the method 600 can be repeated for additional events, samples, or experiments. In some implementations, it can be desirable to generate a new sort strategy to adapt to any variations within the sample or to account for a change in the sample source. For example, in a therapeutic environment, a biological sample can be collected during administration of a drug or other compound. The sort strategy can need adjusting to account for the presence of the drug or compound once administered or unanticipated variation from the initial example selection used to guide the generation of the adaptive strategy. In such instances, the sort strategy can be regenerated in part based on data collected since the original search strategy was trained. For example, the initial strategy can have identified a normal distribution of events, but the actual event data collected for the sample can indicate events having a non-normal distribution.

Determining Sorting Gates

Disclosed herein includes a workflow with software tools that allows a user to collect data from a sample to be sorted, analyze the data within a software or an analysis tool for analyzing flow cytometry data, such as FlowJo® (Ashford, OR), to determine a gating strategy, and/or using the gating strategy for collecting data for the sample. For example, the method can include collecting data (e.g., parameter measurements of a portion of a sample) using a flow cytometer (e.g., in an experiment file), performing an analysis on the data, and translating the results of that analysis into a package (e.g., another experiment file) that the flow cytometer can understand so that the flow cytometer can collect additional data (e.g., parameter measurements of some or all of the remaining sample).

Figure 7:
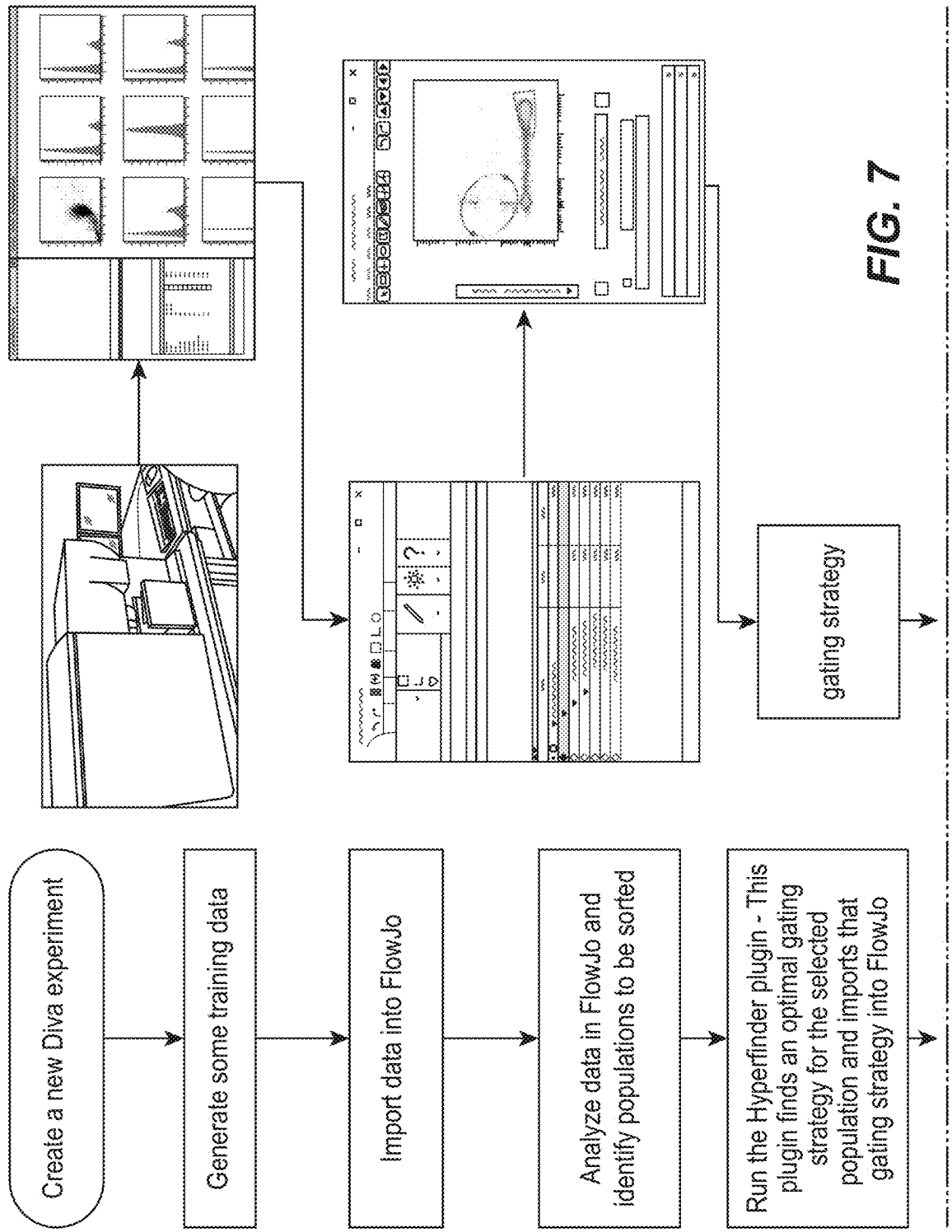
FIG. 7 shows a non-limiting exemplary workflow for determining and using improved (e.g., optimized) sorting gates.
Figure 7:
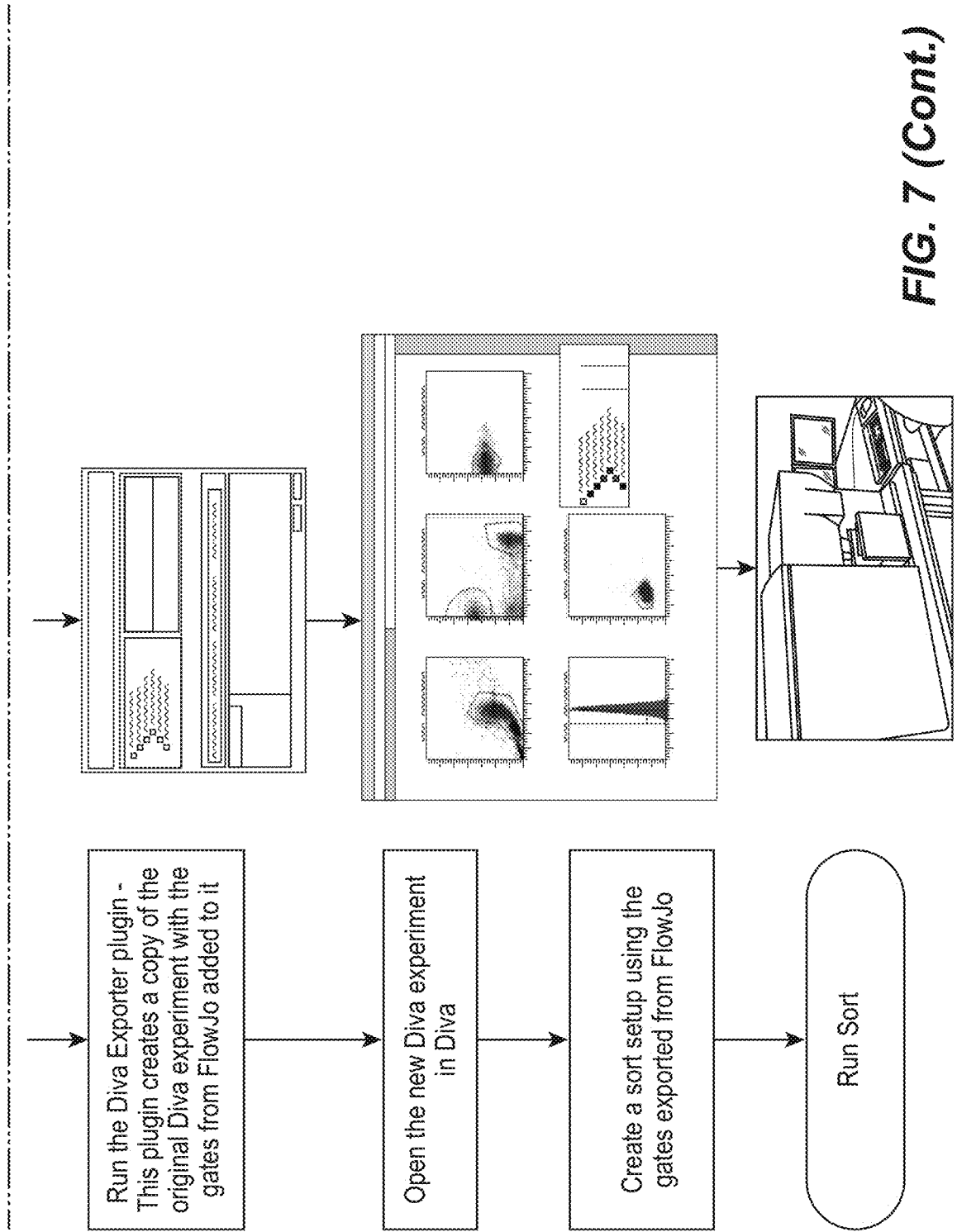

FIG. 7 shows a non-limiting exemplary workflow for determining and using improved (e.g., optimized) sorting gates. In some embodiments, the workflow can include identifying one or more populations to be sorted (e.g., receiving a user's input of one or more populations to be sorted), generating a gating strategy (e.g., an optimal gating strategy), and importing the gating strategy into an acquisition software (e.g., FACSDiva™ (Becton, Dickinson and Company (Franklin Lakes, NJ))) for sorting. In some embodiments, the initial data (e.g., the data of a small portion of the sample) of an experiment can be collected using the cytometer system acquisition software. The initial data can be analyzed within a flow cytometry data analysis software or tool (e.g., FlowJo®) by appropriate means, such as manual gating, cluster analysis, or other computational techniques. The workflow, or a portion thereof, can be implemented as software components of a software for analyzing flow cytometry data, such as FlowJo®.

In some embodiments, the identified population (e.g., a population of cells of interests) can be used within the workspace of the flow cytometry data analysis software (e.g., FlowJo®) as training sets to computationally create a set (e.g., the optimal set) of gates to define each desired population. The gates can be refined by means of an F-measure (e.g., the harmonic mean of purity and yield) to allow for optimal purity and yield. Combinations of two parameters can be analyzed at a time to find the good (e.g., best) parameter pairs on which to create gates. The boundaries of the gates can be refined using one or more techniques, such as bi-stable k-means clustering and Voronoi tessellation. The resulting gates can be loaded into a flow cytometry data analysis software.

In some embodiments, a copy of the original flow cytometry experiment data (e.g., from a BD FACSDiva™ experiment) with the computationally derived gates from the flow cytometry data analysis software (e.g., FlowJo®) added to it as a new worksheet. The new worksheet can contain plots that display the new gating strategy from the flow cytometry data analysis software as well as the new gating hierarchy. The new gating hierarchy can be available for the user to use in selecting which populations to sort.

In some embodiments, the workflow can include performing a computationally complex analysis of cell populations and using results from that analysis to sort cells. The workflow, or a portion thereof, can be implemented by a flow cytometry analysis software. The gates that are used to sort cells can be manually defined by the user by drawing graphical regions on data plots. Using computational techniques, the number of gates required to define a population can be reduced by determining a smaller set of parameters to use. By using a smaller set of parameters and gates, the number of comparisons that need to be made on the sorter when determining the classification of a cell during sorting can be reduced. In some embodiments gate boundaries, which more accurately fit the shape of the population, can be drawn computationally.

In some embodiments, the workflow can include determining (e.g., optimizing) the number of gates (e.g., the number of required gates) to define a population. For example, the F-measure resulting from drawing gates on different pairs of parameters can be used to determine the number the gates. In some embodiments, the workflow can include generating improved gate shapes (e.g., determining optimal polygon gate shapes) for each bivariate gate. For example, generating improved gate shapes can include using bi-stable k-means to overcluster the data, generating a Voronoi tessellation to partition the data space according to data density, and using the boundaries of the resulting partitions to compose the gate boundary. In some embodiments, the workflow can include importing the number of gates to define a population and the improved gate shapes into the flow cytometry data analysis software. In some embodiments, a plugin of the software can determine the number of gates to define a population and the gate shapes. For example, a FlowJo® plugin can perform gate optimization from user identified one or more populations, and the resulting gates can be exported using, for example, another FlowJo® plugin into a Diva experiment usable by a cell sorter.

In some embodiments, flow cytometry data (e.g., FACSDiva™ data) can be imported into R (or another programming language or scripting language), gate optimization can be performed in R, the resulting gates can be viewed in plots, and those gates can be created in the cell sorter software (e.g., FACSDiva™ software) to use for sorting.

In some embodiments, the workflow utilizes F-measure, clustering, FACSDiva™ software experiment storage format, data space partitioning, FlowJo® code structure and plugin API, and/or data scaling functions in FACSDiva™ and FlowJo®.

Sorting Gates Determination System

Figure 8:
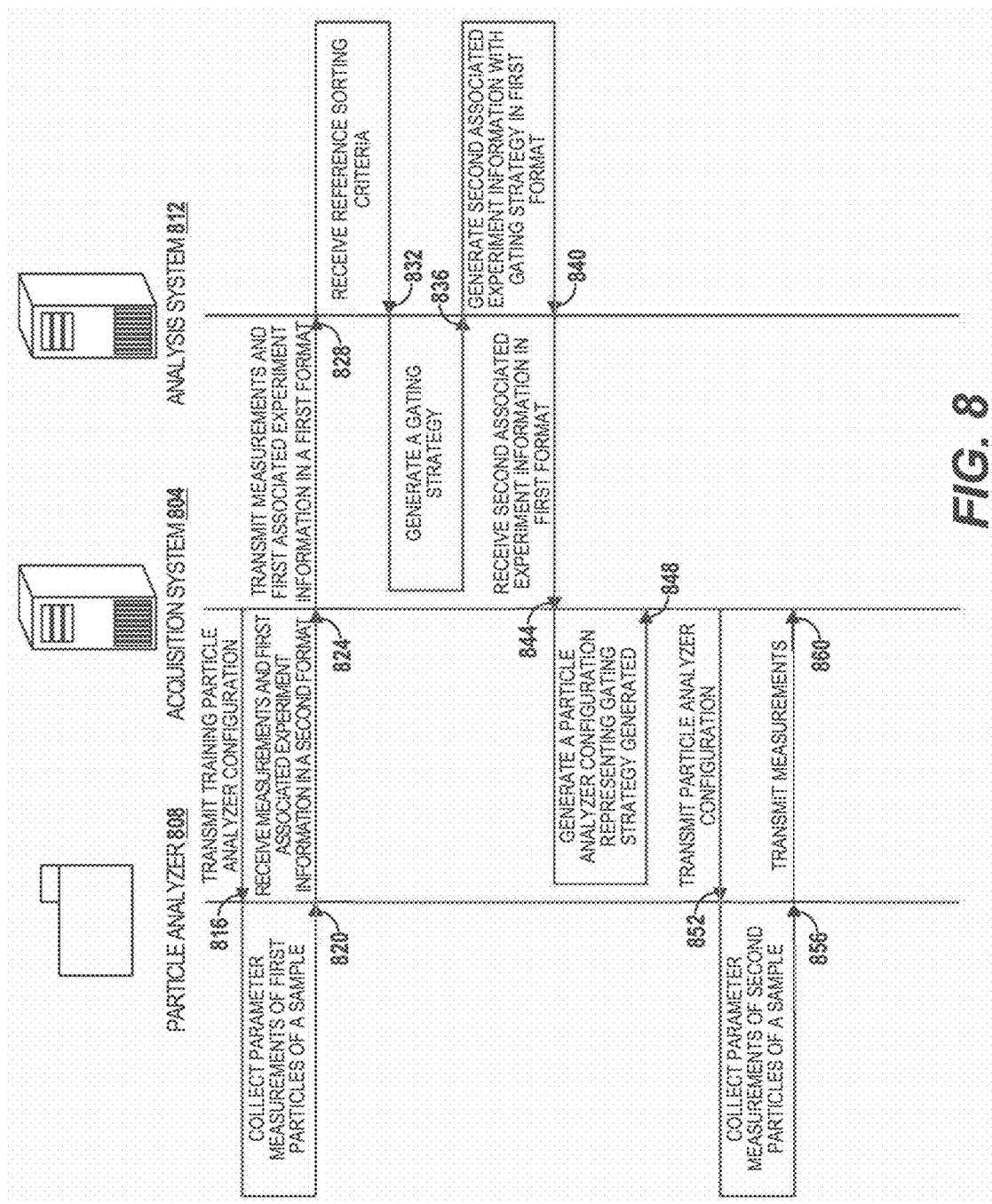
FIG. 8 is an interaction diagram illustrating a non-limiting exemplary embodiment of sorting particles.

FIG. 8 is an interaction diagram illustrating a non-limiting exemplary method of sorting particles. An acquisition system 804 (e.g., a particle analyzer system, a particle analyzer control system, the sorting control system described with reference to FIG. 1, the control system 306 described with reference to FIG. 3, and the computing system 1100) can be operationally associated with a particle analyzer 808 (such as the particle analyzer 102 described with reference to FIG. 1, and the particle sorter system 200 described with reference to FIGS. 2A-2B). In some embodiments, the acquisition system 804 can comprise the particle analyzer 808. The acquisition system 804 can instruct or cause the particle analyzer 808 to collect flow cytometry event data and receive the flow cytometry event data collected from the particle analyzer 808. For example, an acquisition program (e.g., a flow cytometry data acquisition software or program, such as FACSDiva™ (Becton, Dickinson and Company (Franklin Lakes, NJ))) stored as executable instructions in the non-transitory memory of the acquisition system 804 can instruct the particle analyzer 808 to collect flow cytometry event data. The acquisition system 804 can be in communication with an analysis system 812 (e.g., an analytics control 100 described with reference to FIG. 3, and the computing system 1100). In some embodiments, the acquisition system 804 can be a, or implemented, software as a service (SaaS) system. The acquisition system 804 can transmit the flow cytometry event data received to the analysis system 812 for display and analysis. For example, an analysis software (e.g., a flow cytometry data analysis software or program (e.g., FlowJo®)) stored as executable instructions in the non-transitory memory of the analysis system 812 can display the flow cytometry event data to a user.

At interaction 816, the acquisition system 804 can transmit a training particle analyzer configuration that instructs the particle analyzer 816 to collect measurements of parameters of a first plurality of particles of a sample. For example, the acquisition system 804 via an acquisition and control software package can transmit a training particle analyzer configuration that instructs the particle analyzer 816 to collect measurements of parameters of a first plurality of particles of a sample. Subsequently, the analysis system 812 can use the measurements of the parameters collected by the particle analyzer 808 as a training set to determine an improved (e.g., optimized) gating strategy.

At interaction 820, the particle analyzer 816 can collect measurements of the parameters of the first plurality of particles of the sample. The measurements of the parameters of the first plurality of particles of the sample comprise measurements of light emitted fluorescently by the first plurality of particles. The light emitted fluorescently by the first plurality of particles can comprise light emitted fluorescently by cellular component binding reagents bound to the first plurality of particles.

At interaction 824, the acquisition system 804 can receive the measurements of the parameters of the first plurality of particles of the sample associated with an experiment from the particle analyzer 808. In some embodiments, the acquisition system 804 can receive first associated experiment information of the experiment in a first format from the particle analyzer 808. The first associated experiment information in the first format can comprise an identifier of the particle analyzer. The measurements At interaction 828, the acquisition system 804 can transmit (1) the measurements of parameters of a first plurality of particles of a sample associated with the experiment collected by the particle analyzer, and (2) the first associated experiment information of the experiment in the first format to the analysis system 812. The first associated experiment information in the first format can comprise an identifier of the acquisition system. For example, the acquisition system 804 can transmit an experiment file of the acquisition and control software package (e.g., a FACSDiva™ experiment file). The experiment file can include (1) the measurements of parameters of a first plurality of particles of a sample associated with the experiment collected by the particle analyzer, and (2) the first associated experiment information of the experiment in the file format of the experiment (e.g., in a file format of FACSDiva™).

At interaction 832, the analysis system 812 can receive reference sorting criteria for the first plurality of particles of the sample associated with the experiment. The reference sorting criteria can comprise a first plurality of particles of interest selected from the first plurality of particles. To receive the reference sorting criteria for the first plurality of particles of the sample, the analysis system 812 can receive a selection of a first plurality of particles of interest from the first plurality of particles of interest. To receive the selection of the first plurality of particles of interest, the analysis system 812 can display a plurality of images corresponding to the measurements of the parameters of the first plurality of particles of the sample associated with the experiment. In some embodiments, the reference sorting criteria can comprise gating information identifying a plurality of values of the parameters of the first plurality of particles of the sample for distinguishing a first plurality of particles of interest from remaining particles of the first plurality of particles.

At interaction 836, the analysis system 812 can generate a gating strategy. For example, the analysis system 812 can generate a gating strategy based on (1) the measurements of the parameters of the first plurality of particles of the sample associated with the experiment, and (2) the reference sorting criteria for the first plurality of particles of the sample associated with the experiment. For example, the analysis system 812 can generate a gating strategy using the method 600 described with reference to FIG. 6. In some embodiments, to generate the gating strategy, the analysis system 812 can use a gating method (e.g., a gating method implemented by an analysis tool, such as a gate finding plugin implemented by FlowJo®) to generate the gating strategy based on (1) the measurements of the parameters of the first plurality of particles of the sample associated with the experiment, and (2) the reference sorting criteria for the first plurality of particles of the sample associated with the experiment. The gating strategy can comprise a plurality of gates corresponding to pairs of the parameters.

To generate the gating strategy, the analysis system 812 can determine the number of the plurality of gates based on a measure of distinguishing the first plurality of particles of interest from the remaining particles of first plurality of particles using the gating strategy. The plurality of gates can correspond to some or all of the parameters. The analysis system 812 can generate a plurality of polygons based on the measurements of the parameters of the first plurality particles of the sample, the sorting criteria, and the plurality of gates. At least two of the plurality of polygons can comprise polygons of different shapes. The number of the plurality of gates and the number of the plurality of polygons can be identical. The measure can comprise a purity measure and a yield measure of distinguishing the first plurality of particles of interest from the remaining particles of the first plurality of particles using the gating strategy. To generate the plurality of polygons, the analysis system 812 can generate the plurality of polygons enclosing some or all of the plurality of particles of interest.

At interaction 840, the analysis system 812 can generate second associated experiment information of the experiment comprising the first associated experiment information of the experiment and the gating strategy (or a representation of the gating strategy) in the first format. A file can comprise the second associated experiment information. The second associated experiment information can be in a format readable by the acquisition system 804 (e.g., the first format). The second associated experiment information can comprise the gating method used to determine the gating strategy, one or more input parameters of the gating method, one or more output parameters of the gating method, and/or the analysis tool used to determine the gating strategy. The acquisition system 804 can use the second associated experiment information to collect measurements of parameters of some or all of the remaining particles of the sample, for example, after generating a particle analyzer configuration as described below. The representation of the gating strategy in the second associated experiment information can be considered a translation of the gating strategy in a format (e.g., the first format) usable by the acquisition system 804 to collect measurements of parameters of some or all of the remaining particles of the sample.

Alternatively, or additionally, the analysis system 812 can generate a particle analyzer configuration that comprises the first associated experiment information and represents the gating strategy (e.g., the gating strategy or a representation of the gating strategy). The particle analyzer configuration can comprise the gating method used to determine the gating strategy, one or more input parameters of the gating method, one or more output parameters of the gating method, and/or the analysis tool used to determine the gating strategy.

To generate the second associated experiment information, the analysis system 812 can: generate a file comprising the first associated experiment information, the gating strategy, the second associated experiment information, the gating method for generating the gating strategy, one or more input parameters of the gating method, one or more output parameters of the gating method, and/or the analysis tool implementing the gating method. For example, the analysis system 812 can generate a file or a document readable by an acquisition and control software package (e.g., an acquisition and control software package of the analysis system 812). The file can include information related to the gating strategy determined and/or the parameter measurements of the first plurality of particles in a machine readable format. The information related to the gating strategy can comprise the gating strategy and information related to the gating method used to determine the gating strategy. Information related to the gating method can include information about the analysis tool used to generate the gating strategy, such as the gating method used (e.g., tSNE) and the parameters of the gating method used (e.g., the number of clusters). The file can be an experiment file of the acquisition and control software package (e.g., a FACS-Diva™ experiment file). The file can be readable by the acquisition and control software. The file and (1) the measurements of parameters of a first plurality of particles of a sample associated with the experiment collected by the particle analyzer, and (2) the first associated experiment information of the experiment received by the analysis system 812 at interaction 828 can be in the same format (e.g., the first format) or in different formats.

The acquisition and control software can use the experiment file to gate on some or all of the remaining particles of the sample sorted by a particle analyzer 808. For example, the acquisition and control software of the acquisition system 804 can, at interaction 852, cause the particle analyzer 808 to collect measurements of some or all of the remaining particles of the sample at interaction 856. In some embodiments, the acquisition and control software package can cause the particle analyzer 808 to collect measurements of some or all of the remaining particles of the sample directly. Alternatively or additionally, the acquisition and control software package can generate a configuration file for the particle analyzer 808 and use the configuration file to cause the particle analyzer 808 to collect measurements of some or all of the remaining particles of the sample.

To generate the second associated experiment information, the analysis system is programmed to: use an exporter plugin to generate the second associated experiment information of the experiment comprising the first associated experiment information of the experiment and the gating strategy in the first format.

At interaction 844, the acquisition system 804 can receive an indication that the gating strategy has been generated. For example, the acquisition system 804 can receive the second associated experiment information of the experiment from the analysis system 812 in the first format. The second associated experiment information received by the acquisition system 804 can be indicative or indicates the analysis system 812 has: received reference sorting criteria for the first plurality of particles of the sample associated with the experiment; generated a gating strategy based on (1) the measurements of the parameters of the first plurality of particles of the sample associated with the experiment, and (2) the reference sorting criteria for the first plurality of particles of the sample associated with the experiment; and generated the second associated experiment information of the experiment comprising the first associated experiment information of the experiment and the gating strategy in the first format.

At interaction 848, the acquisition system 804 can generate the particle analyzer configuration for the particle analyzer that represents the gating strategy determined by the analysis system 812. At interaction 852, the acquisition system 804 can transmit the particle analyzer configuration that represents the gating strategy and generated from the second associated experiment information of the experiment to the particle analyzer 808. At interaction 856, the particle analyzer 808 can collect measurements of the parameters of a second plurality of particles of the sample (e.g., some or all of the remaining particles of the sample after the first plurality of particles has been used to collect the measurements of the parameters used as a training set) associated with the experiment based at least in part on the particle analyzer configuration. The measurements of the parameters of the second plurality of particles of the sample comprise measurements of light emitted fluorescently by the second plurality of particles. The light emitted fluorescently by the second plurality of particles can comprise light emitted fluorescently by cellular component binding reagents bound to the second plurality of particles. The parameters of the first plurality of particles and the parameters of the second plurality of particles can be identical or different.

At interaction 860, the particle analyzer 808 can transmit the measurements of the parameters of the second plurality of particles of the sample collected to the acquisition system 804. In some embodiments, the measurements of the parameters of the second plurality of particles of the sample collected can be analyzed by, for example, the analysis system 812.

Figure 9:
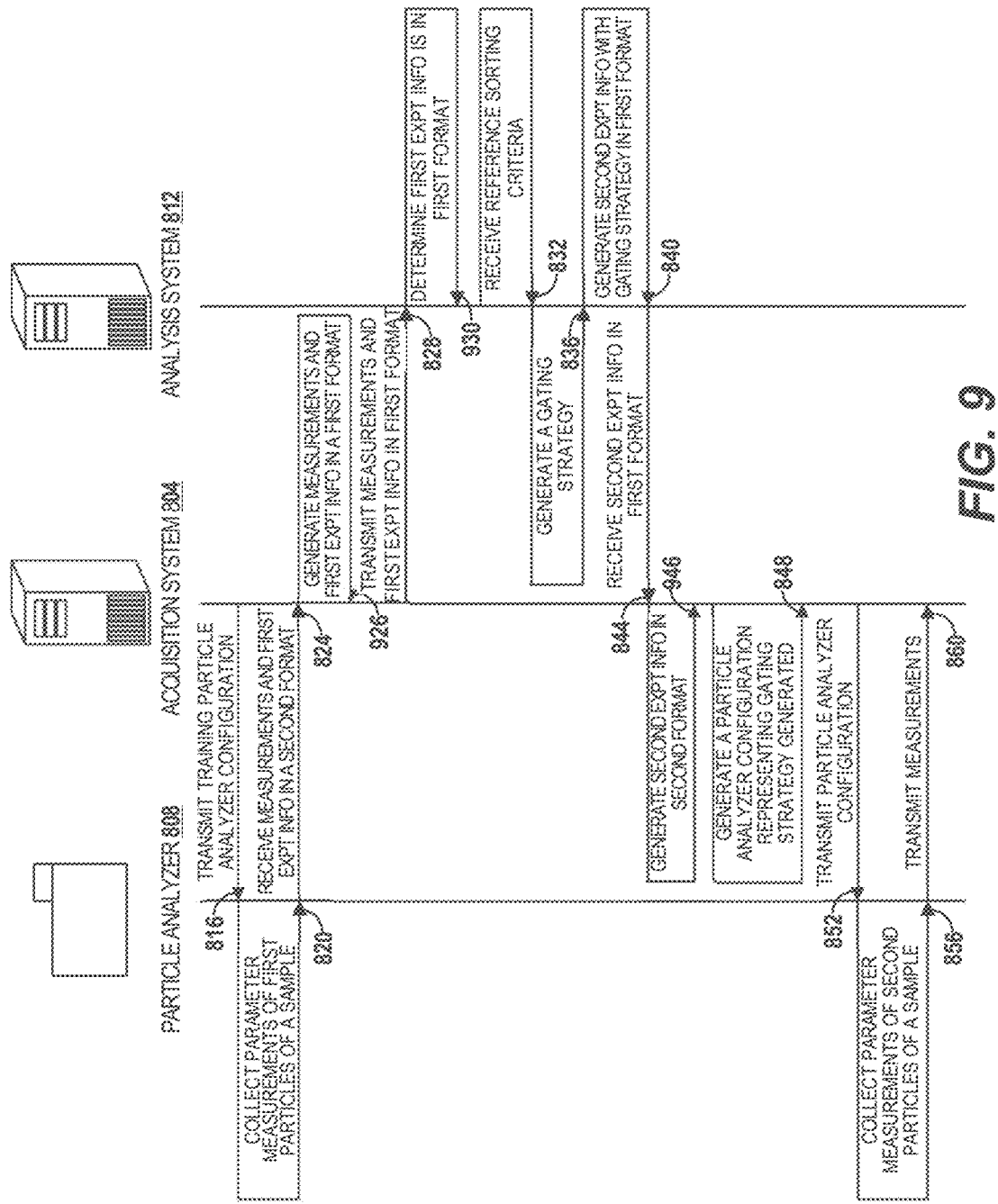
FIG. 9 is an interaction diagram illustrating another non-limiting exemplary method of sorting particles.

FIG. 9 is an interaction diagram illustrating is an interaction diagram illustrating another non-limiting exemplary embodiment of sorting particles. The acquisition system 804 can be operationally coupled to the particle analyzer 808 or comprises the particle analyzer 808. At interaction 816, the acquisition system 804 can transmit a particle analyzer configuration that instructs the particle analyzer 816 to collect measurements of parameters of a first plurality of particles of a sample. At interaction 820, the particle analyzer 816 can collect measurements of the parameters of the first plurality of particles of the sample.

At interaction 824, the acquisition system 804 can receive the measurements of the parameters of the first plurality of particles of the sample associated with an experiment from the particle analyzer 808. For example, the acquisition system 804 receive the first associated experiment information in a second format from the particle analyzer. At interaction 926, the acquisition system 804 can generate the first associated experiment information in the first format from the first associated experiment information in the second format (e.g., using a plugin of the acquisition program or a separate conversion program). The first associated experiment information in the second format can comprise an identifier of the particle analyzer, and wherein the first associated experiment information in the first format comprises an identifier of another particle analyzer.

At interaction 828, the acquisition system 804 can transmit (1) the measurements of parameters of a first plurality of particles of a sample associated with the experiment collected by the particle analyzer, and (2) the first associated experiment information of the experiment in the first format to an analysis system 812. In some embodiments, the acquisition system 804 can be a, or implemented, software as a service (SaaS) system. At interaction 832, the analysis system 812 can receive reference sorting criteria for the first plurality of particles of the sample associated with the experiment. At interaction 836, the analysis system 812 can generate a gating strategy based on (1) the measurements of the parameters of the first plurality of particles of the sample associated with the experiment, and (2) the reference sorting criteria for the first plurality of particles of the sample associated with the experiment.

The analysis system 812 can, at interaction 930 prior to receiving the reference sorting criteria at interaction 832 and/or generating the gating strategy at interaction 836, determine the first associated experiment information is in the first format. For example, the analysis system 812 can generate the gating strategy if the measurements of the parameters are collected by a particular particle analyzer, a particular type of particle analyzer, or a particular brand of particle analyzer.

At interaction 840, the analysis system 812 can generate second associated experiment information of the experiment comprising the first associated experiment information of the experiment and the gating strategy in the first format. At interaction 844, the acquisition system 804 can receive an indication that the gating strategy has been generated. For example, acquisition system 804 can receive the second associated experiment information of the experiment from the analysis system 812 in the first format.

At interaction 946, the acquisition system 804 can generate the second associated experiment information in the second format from the second associated experiment information the first format. The second associated experiment information in the second format can comprise an identifier of the particle analyzer, and wherein the second associated experiment information in the first format comprises an identifier of another particle analyzer.

At interaction 848, the acquisition system 804 can generate the particle analyzer configuration for the particle analyzer that represents the gating strategy determined by the analysis system 812. At interaction 852, the acquisition system 804 can transmit the particle analyzer configuration that represents the gating strategy and generated from the second associated experiment information in the second format to the particle analyzer 808. At interaction 856, the particle analyzer 808 can collect measurements of the parameters of a second plurality of particles of the sample associated with the experiment based at least in part on the particle analyzer configuration. At interaction 860, the particle analyzer 808 can transmit the measurements of the parameters of the second plurality of particles of the sample collected to the acquisition system 804. In some embodiments, the measurements of the parameters of the second plurality of particles of the sample collected can be analyzed by, for example, the analysis system 812.

Although FIGS. 8-9 show the implementation of the acquisition system 804 and the analysis system 812 as two distinct systems, the implementation is illustrative only and is not intended to be limiting. In some embodiments, one system (e.g., the system 1100) can perform the acquisition functionalities of the acquisition system 804 and the analysis functionalities of the analysis system 812. For example, one system can instruct the particle analyzer 808 (e.g., via an acquisition program) to collect flow cytometry event data and determine a gating strategy based on the flow cytometry event data collected (e.g., via a plugin of an analysis program).

Sorting Gates Determination Method

Figure 10:
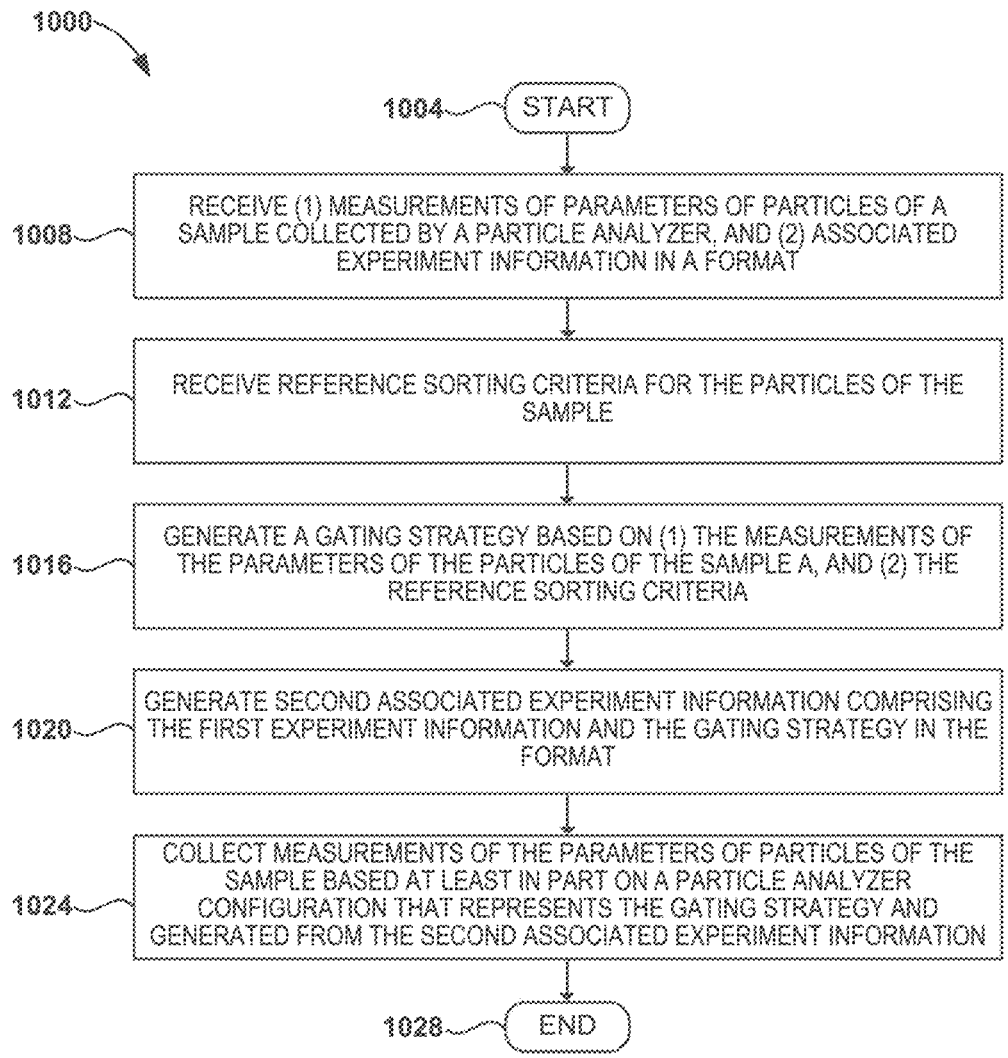
FIG. 10 is a flow diagram showing an exemplary method of determining sorting gates.

FIG. 10 is a flow diagram showing an exemplary method 1000 of sorting a plurality of particles of a sample. The method 1000 may be embodied in a set of executable program instructions stored on a computer-readable medium, such as one or more disk drives, of a computing system. For example, the computing system 1100 shown in FIG. 11 and described in greater detail below can execute a set of executable program instructions to implement the method 1000. When the method 1000 is initiated, the executable program instructions can be loaded into memory, such as RAM, and executed by one or more processors of the computing system 1100. Although the method 1000 is described with respect to the computing system 1100 shown in FIG. 11, the description is illustrative only and is not intended to be limiting. In some embodiments, the method 1000 or portions thereof may be performed serially or in parallel by multiple computing systems.

After the method 1000 begins at block 1004, the method 1000 proceeds to block 1008, where a computing system (e.g., an acquisition system) receives (1) measurements of parameters of a first plurality of particles of a sample associated with an experiment collected by a particle analyzer, and (2) first associated experiment information of the experiment in a first format. In some embodiments, the measurements of the parameters of the first plurality of particles of the sample comprise measurements of light emitted fluorescently by the first plurality of particles. The light emitted fluorescently by the first plurality of particles can comprise light emitted fluorescently by cellular component binding reagents, e.g. antibodies, bound to the first plurality of particles.

In some embodiments, the method can comprise: transmitting (e.g., from an acquisition system) (1) the measurements of the parameters of the first plurality of particles of the sample associated with the experiment, and (2) the first associated experiment information of the experiment in the first format to an analysis system.

The method 1000 proceeds from block 1008 to block 1012, where a computing system (e.g., an analysis system) receives reference sorting criteria for the first plurality of particles of the sample associated with the experiment. In some embodiments, the reference sorting criteria comprises a first plurality of particles of interest selected from the first plurality of particles. In some embodiments, the reference sorting criteria can comprise gating information identifying a plurality of values of the parameters of the first plurality of particles of the sample for distinguishing a first plurality of particles of interest from remaining particles of the first plurality of particles.

In some embodiments, receiving the reference sorting criteria for the first plurality of particles of the sample comprises receiving a selection of a first plurality of particles of interest from the first plurality of particles of interest. Receiving the selection of the first plurality of particles of interest can comprise displaying (e.g., by an analysis system) a plurality of images corresponding to the measurements of the parameters of the first plurality of particles of the sample associated with the experiment.

In some embodiments, receiving the reference sorting criteria comprises receiving, by the analysis system, reference sorting criteria for the first plurality of particles of the sample associated with the experiment.

After receiving reference sorting criteria at block 1012, the method 1000 proceeds to block 1016, where a computing system (e.g., an analysis system) generates a gating strategy based on (1) the measurements of the parameters of the first plurality of particles of the sample associated with the experiment, and (2) the reference sorting criteria for the first plurality of particles of the sample associated with the experiment. In some embodiments, generating the gating strategy comprises generating the gating strategy based on (1) the measurements of the parameters of the first plurality of particles of the sample associated with the experiment, and (2) the reference sorting criteria for the first plurality of particles of the sample associated with the experiment using a gate finding plugin.

In some embodiments, the gating strategy comprises a plurality of gates corresponding to pairs of the parameters. Generating the gating strategy can comprise: determining the number of the plurality of gates based on a measure of distinguishing the first plurality of particles of interest from the remaining particles of first plurality of particles using the gating strategy. The plurality of gates can correspond to some or all of the parameters. The measure can comprise a purity measure and a yield measure of distinguishing the first plurality of particles of interest from the remaining particles of the first plurality of particles using the gating strategy. Generating the gating strategy can comprise: generating a plurality of polygons based on the measurements of the parameters of the first plurality particles of the sample, the sorting criteria, and the plurality of gates. At least two of the plurality of polygons can comprise polygons of different shapes. The number of the plurality of gates and the number of the plurality of polygons can be identical. Generating the plurality of polygons can comprise generating the plurality of polygons enclosing some or all of the plurality of particles of interest.

In some embodiments, generating the gating strategy comprises generating, using the analysis system, the gating strategy based on (1) the measurements of the parameters of the first plurality of particles of the sample associated with the experiment, and (2) the reference sorting criteria for the first plurality of particles of the sample associated with the experiment.

The method 1000 proceeds from block 1016 to block 1020, where a computing system (e.g., an acquisition system) generates the second associated experiment information of the experiment comprising the first associated experiment information of the experiment and the gating strategy in the first format. In some embodiments, generating the second associated experiment information can comprise generating the second associated experiment information of the experiment comprising the first associated experiment information of the experiment and the gating strategy in the first format using an exporter plugin.

In some embodiments, generating the second associated experiment information comprises generating, using the analysis system, the second associated experiment information of the experiment comprising the first associated experiment information of the experiment and the gating strategy in the first format.

After generating the second associated experiment information at block 1020, the method 1000 proceeds to block 1024, where a computing system (e.g., an acquisition system) causes the particle analyzer to collect measurements of the parameters of a second plurality of particles of the sample associated with the experiment based at least in part on a particle analyzer configuration that represents the gating strategy and generated from the second associated experiment information of the experiment.

In some embodiments, the measurements of the parameters of the second plurality of particles of the sample comprise measurements of light emitted fluorescently by the second plurality of particles. The light emitted fluorescently by the second plurality of particles can comprise light emitted fluorescently by cellular component binding reagents, e.g. antibodies, bound to the second plurality of particles.

The method can comprise: generating (e.g., by an acquisition system) the particle analyzer configuration that represents the gating strategy from the second associated experiment information of the experiment. In some embodiments, the method can comprise: transmitting (e.g., from the acquisition system) the particle analyzer configuration to the particle analyzer.

Formats.

In some embodiments, the method comprises: receiving the first associated experiment information in a second format (e.g., the file format generated by the analysis system for the particle analyzer). The method can comprise: generating the first associated experiment information in the first format (e.g., the file format generated by an analysis system for another particle analyzer) from the first associated experiment information in the second format (e.g., using a software program, tool or plugin). The method can comprise: generating the second associated experiment information in the second format from the second associated experiment information the first format (e.g., using a software program, tool or plugin). The first associated experiment information in the second format can comprise an identifier of the particle analyzer and/or identifying information of the acquisition system of the particle analyzer, and the first associated experiment information in the first format can comprise an identifier of another particle analyzer and/or identifying information of an acquisition of the other particle analyzer. The second associated experiment information in the second format can comprise an identifier of the particle analyzer and/or identifying information of the acquisition system of the particle analyzer, and the second associated experiment information in the first format can comprise an identifier of another particle analyzer and/or identifying information of an acquisition of the other particle analyzer. The method can comprise: determining the first associated experiment information is in the first format. Determining the first associated experiment information is in the first format can comprise determining, by the analysis system, the first associated experiment information is in the first format.

In some embodiments, the first associated experiment information in the first format comprises an identifier of the particle analyzer. The first associated experiment information in the first format can comprise an identifier of the acquisition system. The method 1000 ends at block 1028.

Execution Environment

Figure 11:
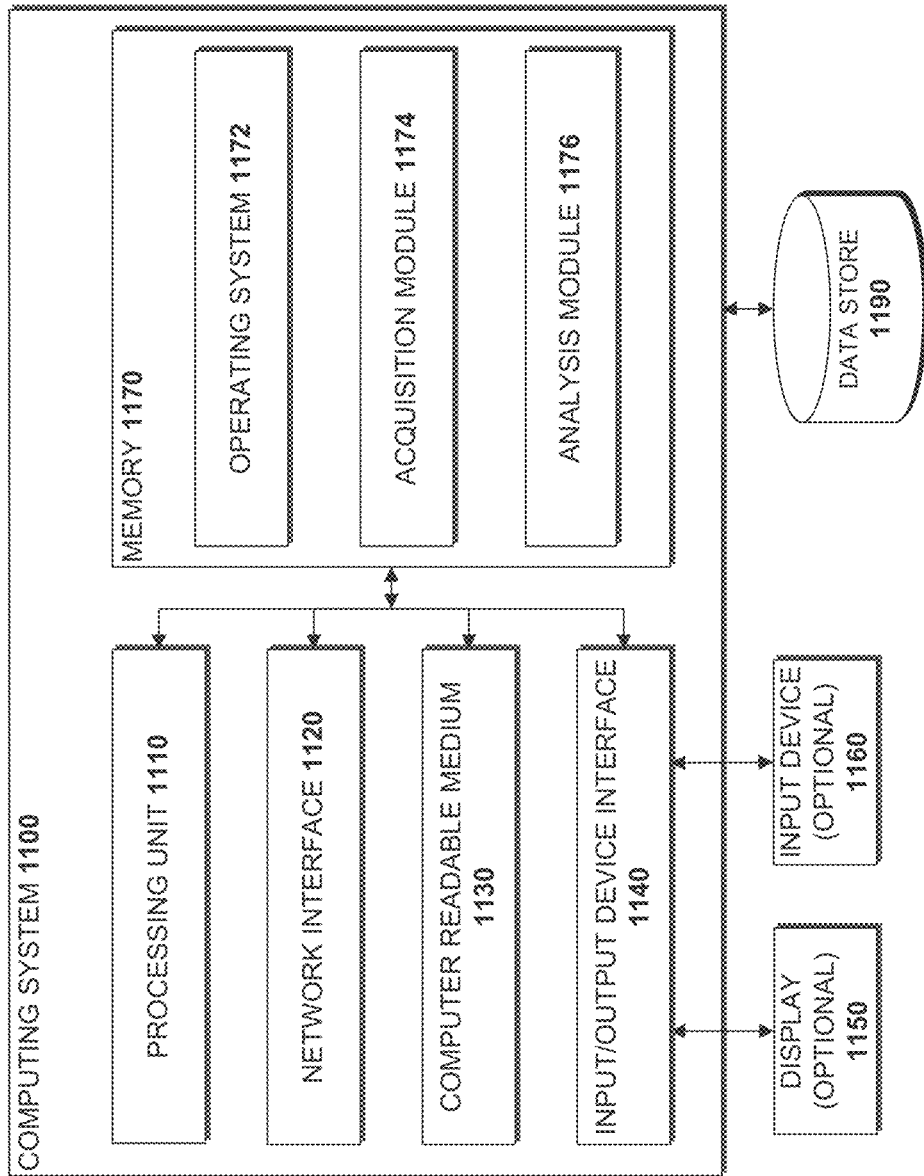
FIG. 11 is a block diagram of an illustrative computing system configured to implement embodiments of a method of determining sorting gates.

In FIG. 11 depicts a general architecture of an example computing device 1100 configured to implement the metabolite, annotation and gene integration system disclosed herein. The general architecture of the computing device 1100 depicted in FIG. 11 includes an arrangement of computer hardware and software components. The computing device 1100 may include many more (or fewer) elements than those shown in FIG. 11. It is not necessary, however, that all of these generally conventional elements be shown in order to provide an enabling disclosure. As illustrated, the computing device 1100 includes a processing unit 1110, a network interface 1120, a computer readable medium drive 1130, an input/output device interface 1140, a display 1150, and an input device 1160, all of which may communicate with one another by way of a communication bus. The network interface 1120 may provide connectivity to one or more networks or computing systems. The processing unit 1110 may thus receive information and instructions from other computing systems or services via a network. The processing unit 1110 may also communicate to and from memory 1170 and further provide output information for an optional display 1150 via the input/output device interface 1140. The input/output device interface 1140 may also accept input from the optional input device 1160, such as a keyboard, mouse, digital pen, microphone, touch screen, gesture recognition system, voice recognition system, gamepad, accelerometer, gyroscope, or other input device.

The memory 1170 may contain computer program instructions (grouped as modules or components in some embodiments) that the processing unit 1110 executes in order to implement one or more embodiments. The memory 1170 generally includes RAM, ROM and/or other persistent, auxiliary or non-transitory computer-readable media. The memory 1170 may store an operating system 1172 that provides computer program instructions for use by the processing unit 1110 in the general administration and operation of the computing device 1100. The memory 1170 may further include computer program instructions and other information for implementing aspects of the present disclosure.

For example, in one embodiment, the memory 1170 includes an acquisition module 1174 for receiving (e.g., causing a particle analyzer to collect) flow cytometry event data, such as measurements of parameters of particles of a sample. The memory 1170 may additionally or alternatively include an analysis module 1176 for determining a gating strategy from flow cytometry event data. In addition, memory 1170 may include or communicate with the data store 1190 and/or one or more other data stores that store the flow cytometry event data collected and/or the gating strategy determined.

Terminology

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields, buttons, or other interactive controls for receiving input signals or providing electronic information or for providing information to the user in response to any received input signals. A UI may be implemented in whole or in part using technologies such as hyper-text mark-up language (HTML), JAVASCRIPT™, FLASH™, JAVA™, .NET™, WINDOWS OS™, macOS™, web services, or rich site summary (RSS). In some implementations, a UI may be included in a stand-alone client (for example, thick client, fat client) configured to communicate (e.g., send or receive data) in accordance with one or more of the aspects described.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as specifically programmed event processing computers, wireless communication devices, or integrated circuit devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable medium may be a non-transitory storage medium. The techniques additionally, or alternatively, may be realized at least in part by a computer-readable communication medium that carries or communicates program code in the form of instructions or data structures and that can be accessed, read, and/or executed by a computing device, such as propagated signals or waves.

The program code may be executed by a specifically programmed sort strategy processor, which may include one or more processors, such as one or more digital signal processors (DSPs), configurable microprocessors, an application specific integrated circuits (ASICs), field programmable gate arrays (FPGAs), or other equivalent integrated or discrete logic circuitry. Such a graphics processor may be specially configured to perform any of the techniques described in this disclosure. A combination of computing devices, e.g., a combination of a DSP and a microprocessor, a plurality of microprocessors, one or more microprocessors in conjunction with a DSP core, or any other such configuration in at least partial data connectivity may implement one or more of the features describe. In some aspects, the functionality described herein may be provided within dedicated software modules or hardware modules configured for encoding and decoding, or incorporated in a specialized sorting control card.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An analysis system for generating a gating strategy comprising:
   non-transitory memory configured to store executable instructions; and
   a hardware processor in communication with the non-transitory memory, the hardware processor programmed by the executable instructions to:
   receive, from an acquisition system in communication with a particle analyzer, (1) measurements of parameters of a first plurality of particles of a sample associated with an experiment, and (2) first associated experiment information of the experiment in a first format, wherein the first associated experiment information of the experiment comprises a particle analyzer identifier;
   receive reference sorting criteria for the first plurality of particles of the sample associated with the experiment;
   generate a gating strategy based on (1) the measurements of the parameters of the first plurality of particles of the sample associated with the experiment, and (2) the reference sorting criteria for the first plurality of particles of the sample associated with the experiment;
   generate second associated experiment information of the experiment comprising the first associated experiment information of the experiment and the gating strategy in the first format; and
   transmit the second associated experiment information of the experiment to the acquisition system.

2. The analysis system of claim 1, wherein to generate the second associated experiment information, the hardware processor is programmed by the executable instructions to: generate a file comprising the first associated experiment information, the gating strategy, the second associated experiment information, the gating method for generating the gating strategy, one or more input parameters of the gating method, one or more output parameters of the gating method, and/or the analysis tool implementing the gating method.

3. The analysis system of claim 1, wherein the gating strategy comprises a plurality of gates corresponding to pairs of the parameters.

4. The analysis system of claim 1, wherein to generate the gating strategy, the hardware processor is programmed by the executable instructions to: use a gating method of an analysis tool to generate the gating strategy based on (1) the measurements of the parameters of the first plurality of particles of the sample associated with the experiment, and (2) the reference sorting criteria for the first plurality of particles of the sample associated with the experiment.

5. The analysis system of claim 4, wherein the second associated experiment information comprises the gating method, one or more input parameters of the gating method, one or more output parameters of the gating method, and/or the analysis tool.

6. The analysis system of claim 5, wherein the reference sorting criteria comprises a first plurality of particles of interest selected from the first plurality of particles.

7. The analysis system of claim 6, wherein to generate the gating strategy, the hardware processor is programmed by the executable instructions to:
   determine the number of the plurality of gates based on a measure of distinguishing the first plurality of particles of interest from the remaining particles of first plurality of particles using the gating strategy, wherein the plurality of gates correspond to some or all of the parameters; and
   generate a plurality of polygons based on the measurements of the parameters of the first plurality particles of the sample, the sorting criteria, and the plurality of gates, wherein at least two of the plurality of polygons comprise polygons of different shapes, wherein the number of the plurality of gates and the number of the plurality of polygons are identical.

8. The analysis system of claim 7, wherein the measure comprises a purity measure and a yield measure of distinguishing the first plurality of particles of interest from the remaining particles of the first plurality of particles using the gating strategy.

9. The analysis system of claim 7, wherein to generate the plurality of polygons, the hardware processor is programmed by the executable instructions to: generate the plurality of polygons enclosing some or all of the plurality of particles of interest.

10. The analysis system of claim 9, wherein the acquisition system is programmed to:
    generate the first associated experiment information in the first format from a second format; and
    generate the second associated experiment information in the second format from the first format.

11. The analysis system of claim 10, wherein the first associated experiment information in the second format comprises an identifier of the particle analyzer, and wherein the first associated experiment information in the first format comprises an identifier of another particle analyzer.

12. The analysis system of claim 10, wherein the second associated experiment information in the second format comprises an identifier of the particle analyzer, and wherein the second associated experiment information in the first format comprises an identifier of another particle analyzer.

13. The analysis system of claim 10, wherein the hardware processor is programmed by the executable instructions to, prior to generating the gating strategy: determine the first associated experiment information is in the first format.

14. The analysis system of claim 13, wherein the first associated experiment information in the first format comprises an identifier of the acquisition system.

15. The analysis system of claim 14,
    wherein the acquisition system is programmed to:
    generate a particle analyzer configuration for the particle analyzer that represents the gating strategy; and
    transmit the particle analyzer configuration to the particle analyzer, and
    wherein the particle analyzer is programmed to:
    collecting measurements of the parameters of a second plurality of particles of the sample associated with the experiment based at least in part on the particle analyzer configuration.

16. The analysis system of claim 15, wherein the reference sorting criteria comprises gating information identifying a plurality of values of the parameters of the first plurality of particles of the sample for distinguishing a first plurality of particles of interest from remaining particles of the first plurality of particles.

17. The analysis system of claim 16, wherein to receive the reference sorting criteria for the first plurality of particles of the sample, the hardware processor is programmed by the executable instructions to:
   receive a selection of a first plurality of particles of interest from the first plurality of particles of interest.

18. The analysis system of claim 17, wherein to receive the selection of the first plurality of particles of interest, the hardware processor is programmed by the executable instructions to:
   display a plurality of images corresponding to the measurements of the parameters of the first plurality of particles of the sample associated with the experiment.

19. The analysis system of claim 18, wherein the measurements of the parameters of the first plurality of particles of the sample comprise measurements of light emitted fluorescently by the first plurality of particles.

20. The analysis system of claim 19, wherein the light emitted fluorescently by the first plurality of particles comprises light emitted fluorescently by cellular component binding reagents bound to the first plurality of particles.

21. The analysis system of claim 15, wherein the particle analyzer configuration comprises the gating method, one or more input parameters of the gating method, one or more output parameters of the gating method, and/or the analysis tool.

* * * * *